US011184778B2

(12) United States Patent
Loomba et al.

(10) Patent No.: US 11,184,778 B2
(45) Date of Patent: Nov. 23, 2021

(54) MOBILE SERVICE CHAIN PLACEMENT

(71) Applicant: Intel Corporation, Santa Clara, CA (US)

(72) Inventors: Radhika Loomba, Maynooth (IE); Leonard Feehan, Leixlip (IE); Joseph Butler, Stamullen (IE); Thijs Metsch, Cologne (DE)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 15/900,604

(22) Filed: Feb. 20, 2018

(65) Prior Publication Data
US 2019/0045374 A1 Feb. 7, 2019

(51) Int. Cl.
| H04W 4/00 | (2018.01) |
| H04W 16/18 | (2009.01) |
| H04W 40/18 | (2009.01) |
| H04W 28/02 | (2009.01) |
| H04L 12/717 | (2013.01) |

(52) U.S. Cl.
CPC ....... *H04W 16/18* (2013.01); *H04W 28/0226* (2013.01); *H04W 40/18* (2013.01); *H04L 45/42* (2013.01)

(58) Field of Classification Search
CPC . H04W 16/18; H04W 28/0226; H04W 40/18; H04L 45/42; H04L 12/24; H04L 12/26
See application file for complete search history.

(56) References Cited

U.S. PATENT DOCUMENTS

| 10,530,632 B1* | 1/2020 | Mukhopadhyaya ......................... H04L 41/5041 |
| 2017/0012898 A1* | 1/2017 | Zhu .......... H04L 45/02 |
| 2017/0118088 A1* | 4/2017 | Koizumi .............. H04L 41/147 |
| 2017/0150420 A1* | 5/2017 | Olsson .................... H04W 8/06 |
| 2017/0371692 A1* | 12/2017 | Connolly ............ G06F 9/45558 |
| 2018/0027066 A1* | 1/2018 | Van De Groenendaal ................... G06F 3/0665 709/226 |
| 2019/0182153 A1* | 6/2019 | Gundavelli .......... H04L 67/327 |
| 2020/0028749 A1* | 1/2020 | Dhandu ............. H04L 12/4641 |

* cited by examiner

*Primary Examiner* — Abdelnabi O Musa
(74) *Attorney, Agent, or Firm* — Patent Capital Group

(57) ABSTRACT

There is disclosed in one example a computing apparatus, including: a hardware platform; and a service chain pre-placement analyzer to operate on the hardware platform and configured to: receive a total utility input for a service chain placement; predict a mobility pattern for the service chain placement; and compute an average utility for the service chain placement, wherein the average utility is a product of the total utility and the mobility pattern.

25 Claims, 16 Drawing Sheets

MOBILE SERVICE CHAIN PLACEMENT

FIELD OF THE SPECIFICATION

This disclosure relates in general to the field of mobile computing, and more particularly, though not exclusively, to a system and method for mobile service chain placement.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
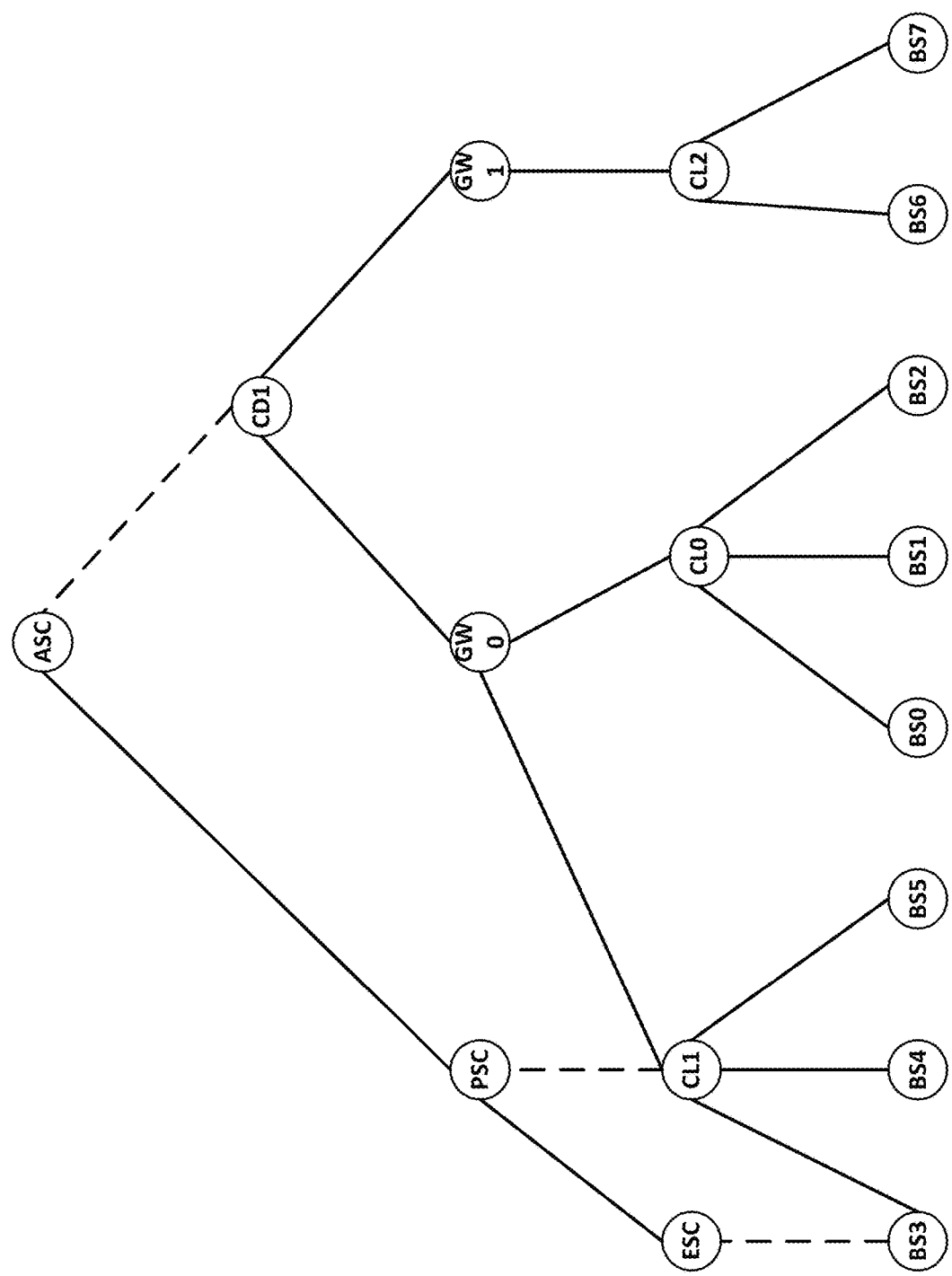
FIG. 1 is a block diagram of a service chain placement, according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

When determining service chain placement for a mobile computing system, spatial locality may become a premium consideration. For example, if an end user is operating user equipment (UE) to access mobile video streaming services while riding as a passenger in a vehicle, the user may jump from one base station to another. While the user is connected to the first base station, there is an existing service chain in place that services the user's computing requests. But when hand off to the second base station occurs, some or all of that service chain may need to be replicated, reproduced, or migrated to optimize access to the service chain via the second base station.

For example, certain elements of the service chain may be provided by a cloudlet, which should be understood to encompass any computing device that is self-contained and may provide computing services within a data center or service chain. For example, a cloudlet could be a rack scale architecture, computing rack, a shipping container with self-contained computing resources, a truck with computing resources, or a discrete device connected to a service chain that provides discrete computing resources.

The cloudlet may, for example, be configured to provide certain edge services, or other computing resources within the service chain.

Optimal placement of the service chain, which may include multiple connected service components, is a non-trivial computation problem, itself. Even when deploying a small set of service components, the search space of all possible solutions for the service chain placement may be very large. The difficulty can be exacerbated by common use cases such as an advanced driver assistance system (ADAS) or augmented reality services, which may provide heterogeneous distributed infrastructure including mobile resources (for example, user equipment, mobile devices, ADAS-equipped cars, and so forth) that consume the service. In these scenarios, the infrastructure and its topology may change dynamically and there may be time sensitive service requirements. For example, it may be less expensive to keep an edge service on a cloudlet close to a first base station owned by the service provider, rather than migrating this function to a second cloudlet spatially closer to the second base station, but that is owned by a third party and thus will incur charges. On the other hand, if the user's mobile computing experience is consistently disrupted by making shortsighted least-cost determinations, then users may become dissatisfied and subscriptions may fall. Thus, to successfully determine an optimized service chain placement, repeated adaptations of the placement may be necessary to ensure that the placement is truly optimal.

Taking an ADAS or self-driving car as an example, fixed infrastructure may be required to provide context-driven messaging. The infrastructure may also be required to provide services and content delivery. This infrastructure may include public cellular, dedicated roadside units (RSUs) and other location specific gateway appliances. There may also be car-to-car interactions wherein mobile resources can act as super peer endpoints.

Thus, the problem of optimal service chain placement extends to including additional constraints in terms of the service performance experienced by a mobile device consuming a service. This may relate to costly operations of repeatedly migrating services closer to the car as it moves along the road.

Examining all possible solutions for a service chain placement may be very complicated and difficult. In fact, this problem can be replaced to the non-deterministic polynomial-time hard (NP-Hard) Job Shop scheduling problem, because the combinatorial optimization includes both spatial and temporal considerations.

Some existing systems provide for optimizing service chain placement in an infrastructure with static resources. This may include genetic algorithms, approximation algorithms, stochastic bin-packaging methods, and multiple heuristics. However, these solutions have limited utility in relation to mobile resources that are consuming time-sensitive services as part of a dynamically-adapting distributed heterogeneous infrastructure.

In some cases, these existing solutions may place service chains pessimistically to avoid conflicts and workload pattern-induced performance issues. Conversely, these may place service chains too optimistically to avail improved total cost of ownership (TCO) opportunities. Even when service chain placement is considered in these scenarios, it may be based on mobility models alone, without including parameters such as gross profit from placement, service distribution, and resource utilization, which are also important considerations in service chain placement.

Better optimization may be achieved with a hybrid descriptive and analytical model that computes the advantages of possible placement solutions based on multiple parameters, and which may include intelligent pre-placement of the service chain to ensure the required performance by moving one or more service components closer to the mobile resources. For example, the "utility" (or benefit) of each possible placement solution may first be calculated by using a multi-attribute utility theory, while also considering both resource provider and service consumer objectives. Next, the model may be integrated with an understanding of the underlying mobility pattern of the resources. Finally, comparisons may be made between possible placements using the computed utility, mobility pattern, and cost of migrating service components between placements, to select a pre-placement for the service chain which is most advantageous in terms of cost involved.

Advantageously, by pre-computing an optimal service chain, the new service chain placement can be in place and ready to go before the user reaches, for example, the new base station. This can minimize service disruption, and help to optimize profits for the service operator.

The method described here is configured to continuously optimize content, service mapping, and paths across dynamic systems and use cases, such as autonomous driving and augmented reality. This optimization may be performed automatically and at scale to guarantee measurable service quality levels. This enables fast content distribution for mobile computing use cases, thus allowing infrastructure operators and service providers to provide low latency access to edge services and infrastructure.

Because the system and method described herein dynamically adapt the utility of service chain placements based on mobility of resources, the method intelligently pre-places service components closer to mobile resources, often on the order of within milliseconds, rather than on the order of seconds or minutes. This enhanced intelligence enables reasoning over placements for capacity planning and advanced control, thus mitigating the abstraction issue in cloud/edge/fog use cases. This may also help operators to benefit more fully from ongoing innovations and differentiations on the platform, because Intel® architecture (IA) features, among others, are captured in the utility function.

A system and method for mobile service chain placement will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of a service chain placement, according to one or more examples of the present specification. In this example, a plurality of base stations, namely base stations 0 through 7, are distributed, such as along one or more roads that a driver may take while operating user equipment.

A cloudlet zero CL0 services base stations BS0, BS1, and BS2. A cloudlet one CL1 services base stations BS3, BS4, and BS5. A cloudlet two CL2 services base stations BS6 and BS7.

Base station three BS3 also has provisioned, and communicatively coupled thereto, an edge service component ESC. ESC of BS3 is communicatively coupled to a processing service component PSC, which may also be coupled to CL1.

Cloudlets zero CL0 and one CL1 couple to a cloud CD1 via gateway GW0. Cloudlet two CL2 couples to a gateway GW1 to cloud CD1.

Cloud CD1 has access to an analytics service component ASC, which may also communicatively couple to PSC.

The system as described in the present specification may be tailored toward service chain placement for distributed infrastructure that includes mobile resources. In FIG. 1, the service chain can broadly be divided into analytics (as provided by ASC), processing (as provided by PSC and cloud CD1), and edge services (as provided by ESC, and base stations BS0 through BS7). Both ASC and PSC can be hosted by cloudlets one CL1 and two CL2, and cloud CD1 in the present embodiment.

Note that the number and type of components in the service chain is not limited to the layout described here. Rather, this layout is provided by way of illustrative and nonlimiting example, and should be understood to be a representative model of any suitable service chain placement. Throughout the remainder of this specification, a service chain similar to the one disclosed herein will be used as an illustrative example of the teachings of the present specification. The teachings of the present specification may be otherwise adapted to other configurations that are compatible with these teachings.

For the example service chain and distributed infrastructure resources, FIG. 1 illustrates only one example of a possible placement of the service chain on the distributed infrastructure. Note that ASC is provided on cloud CD1, PSC is provided on cloudlet one CL1, and ESC is provided on base station BS3.

For an autonomous driving scenario, such as illustrated in the following FIGURES, this service chain placement can be simulated, such as in ASC.

Figure 2:
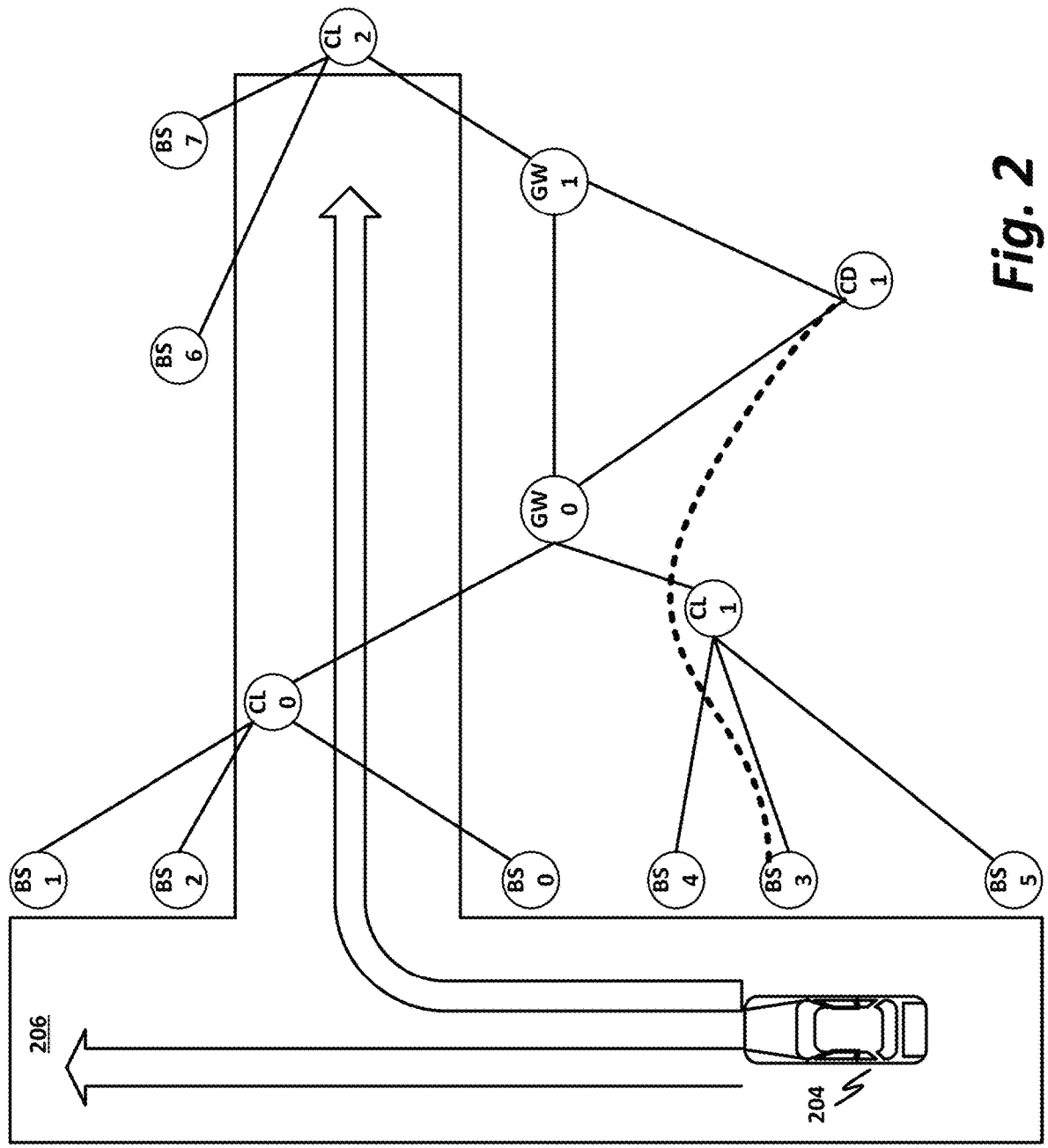
FIG. 2 is a block diagram illustrating a vehicle moving along a roadway, according to one or more examples of the present specification.

FIG. 2 is a block diagram illustrating a vehicle 204 moving along a roadway 206, according to one or more examples of the present specification. Initially, vehicle 204 is moving straight along roadway 206. A user in vehicle 204 may be accessing mobile network resources via base station BS3, which as illustrated in FIG. 1 communicatively couples to cloudlet one CL1 and cloud CD1. As illustrated in FIG. 1, BS3 may provide an edge service component, while CL1 may provide a processing service component. Cloud CD1 may provide an analytic service component.

Note that as vehicle 204 travels along roadway 206, it may encounter several base stations along the way. Note that the illustration here is not to scale, but certain elements have been exaggerated in size for purposes of illustration. In practice, base stations BS0 through BS7 may be located miles apart from each other.

For purposes of illustration, it can be assumed that a passenger in vehicle 204 is operating UE to access streaming video, which requires a video transmuxer service to be hosted in a service chain represented by the dashed line going from BS3 to CL1 to CD1. The mobility pattern of vehicle 204 may be considered an input to the system. Thus, the solution may use the car's velocity and its distance from the base station to evaluate a best possible pre-placement of this service chain within a few milliseconds, while also considering several other parameters, such as gross profit, resource utilization, latency, and others. The possible pre-placement options for each service component may include migrating the ESC to any of the base stations so that it is available on the base station the user is currently connected to.

Pre-placement options for the processing service component include the option of migrating the PSC from CL1 to either one of CL0 or CL2, depending on which direction the vehicle chooses. Pre-placement options for the ASC include migrating from CD1 to GW0 or GW1, depending on the vehicle's path. Also note that in some examples, the solid lines connecting the various data components herein may represent physical network connections.

In this scenario, a hybrid descriptive and analytical model may be used to compute the advantages of possible placement solutions and make an intelligent pre-placement decision for edge service components closer to the mobile user.

Figure 3:
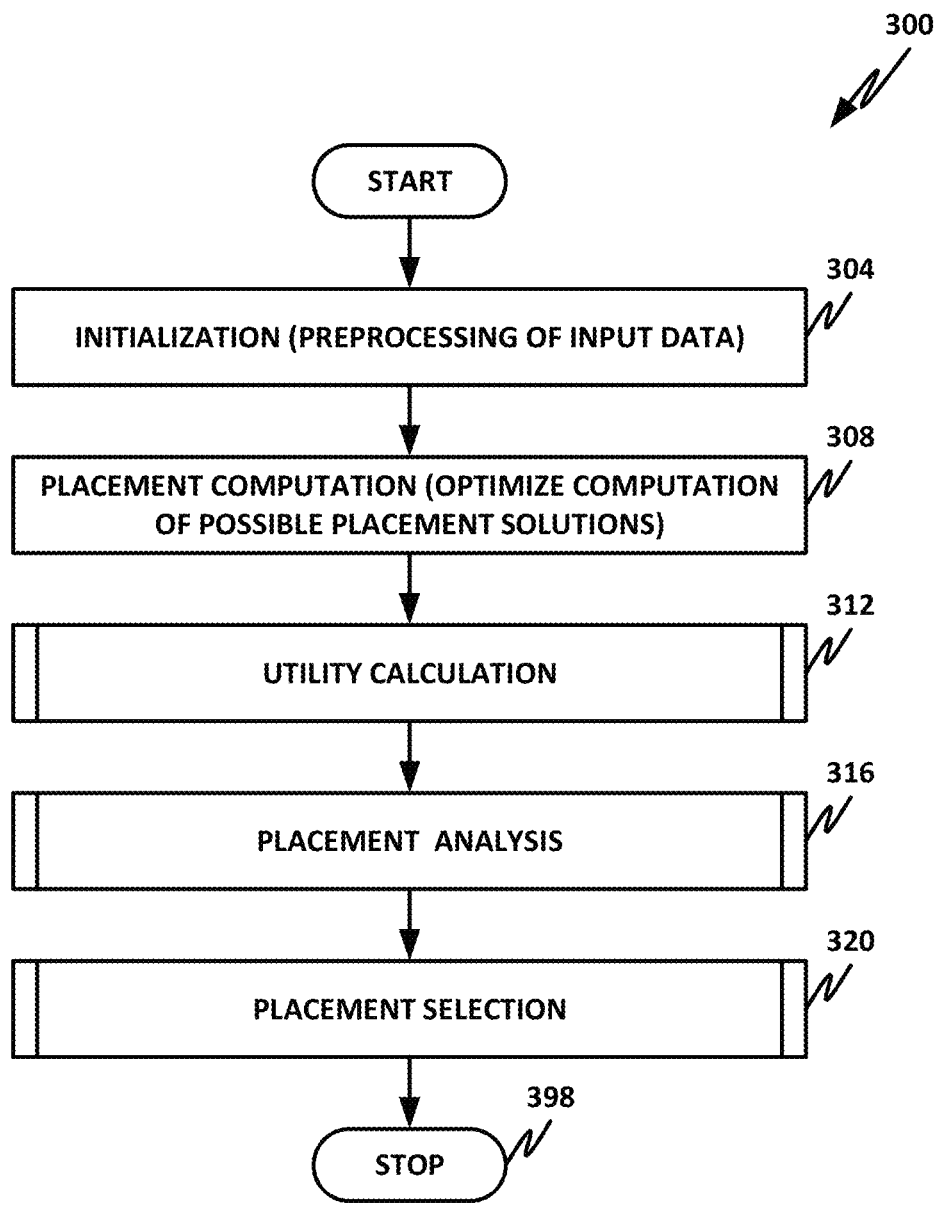
FIG. 3 is a flowchart of a method that provides pre-placement analysis, according to one or more examples of the present specification.

FIG. 3 is a flowchart of a method 300 that provides such pre-placement analysis, according to one or more examples of the present specification.

In FIG. 3, the system 300 may provide input details of the distributed infrastructure resources in a service chain request. In block 304, the system may perform initialization, including pre-processing of input data. In initialization phase 304, details of the resources in the distributed infrastructure and the service chain request may be provided as an input. These may be preprocessed to compute, for example, the cost, capacity, utilization, and mobility of the infrastructure resources, along with the capacity required, performance constraints, and conditions of the placement for the service components.

In block 308, the system may perform a placement computation, which may include optimizing the computation of possible placement solutions. In placement computation phase 308, an optimization algorithm such as an evolutionary algorithm, a Pareto front approximation, or a particle swarm optimization, by way of nonlimiting example, may be used to reduce the complexity of computing all possible placement solutions. This presents a reduced set of possible placement solutions, while including the optimal placement solution.

In sub process 312, a utility calculation is performed. Sub process 312 is described in more detail in FIG. 4.

In sub process 316, placement analysis is performed. Sub process 316 is described in more detail in connection with FIG. 5.

In sub process 320, a placement selection occurs. Sub process 320 is defined in more detail in connection with FIG. 6.

In block 398, the method is done.

Figure 4:
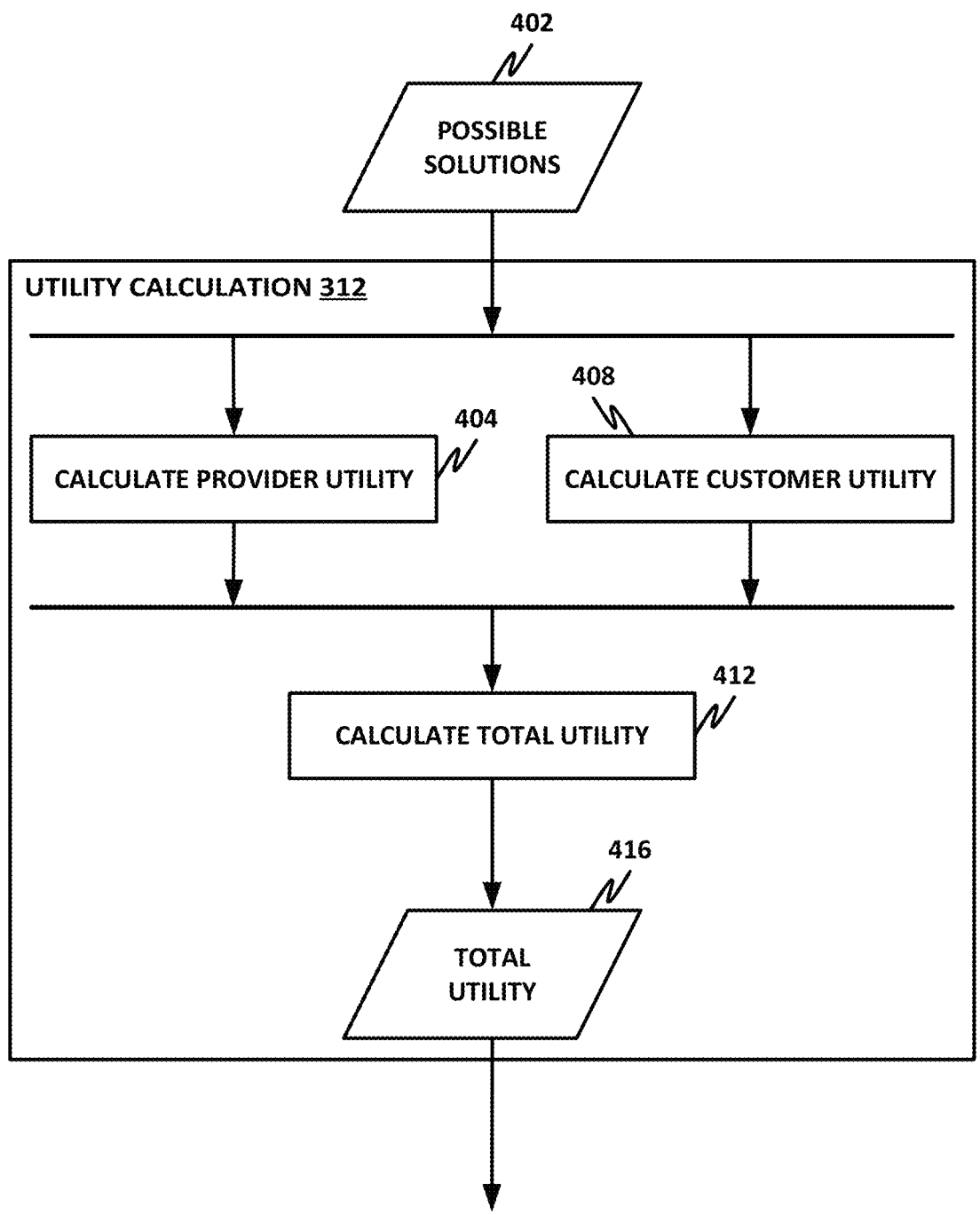
FIG. 4 is a flowchart of a utility calculation, according to one or more examples of the present specification.
Figure 9:
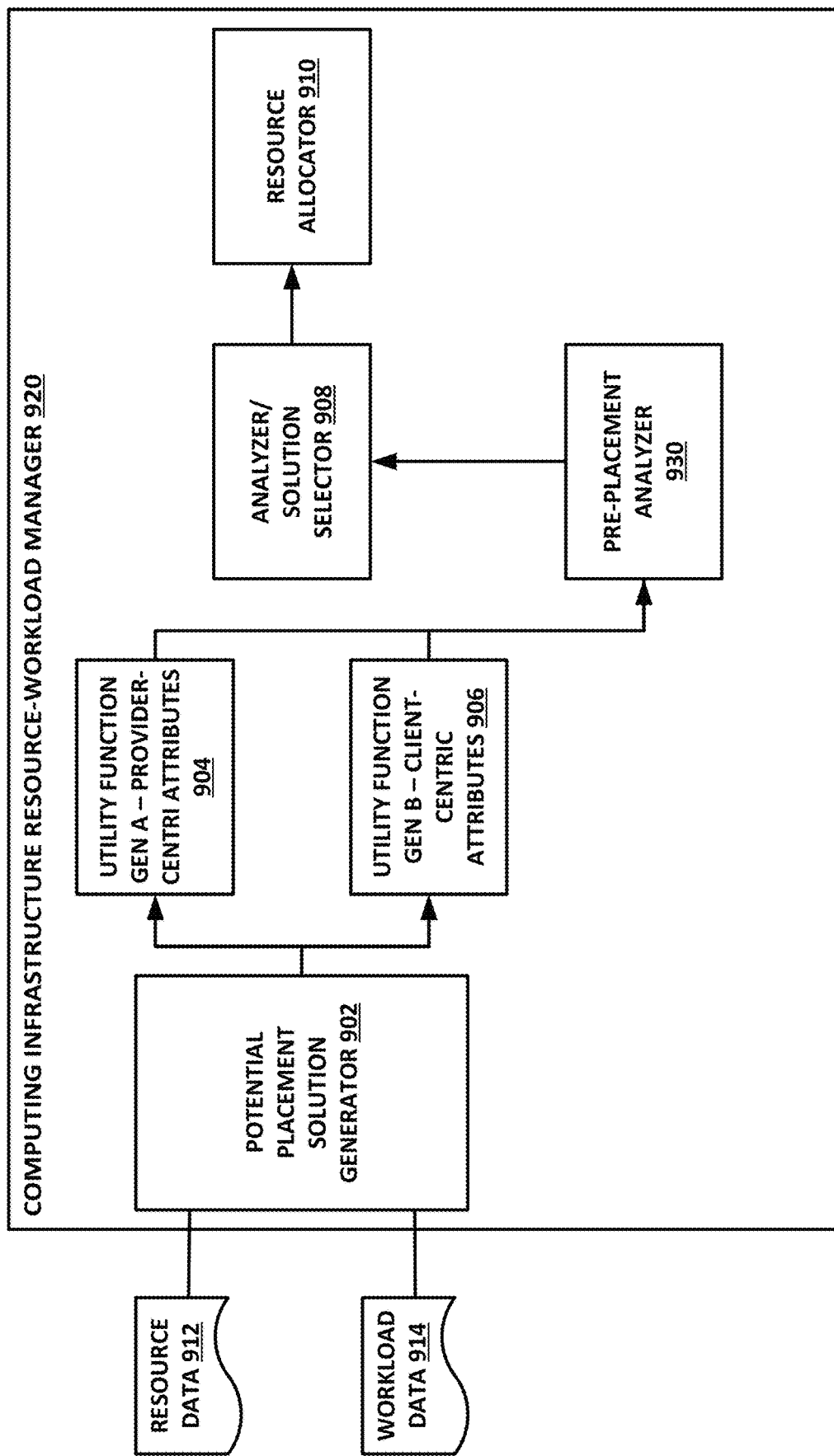
FIG. 9 illustrates an example computing infrastructure resource-workload manager, according to one or more examples of the present specification.
Figure 10:
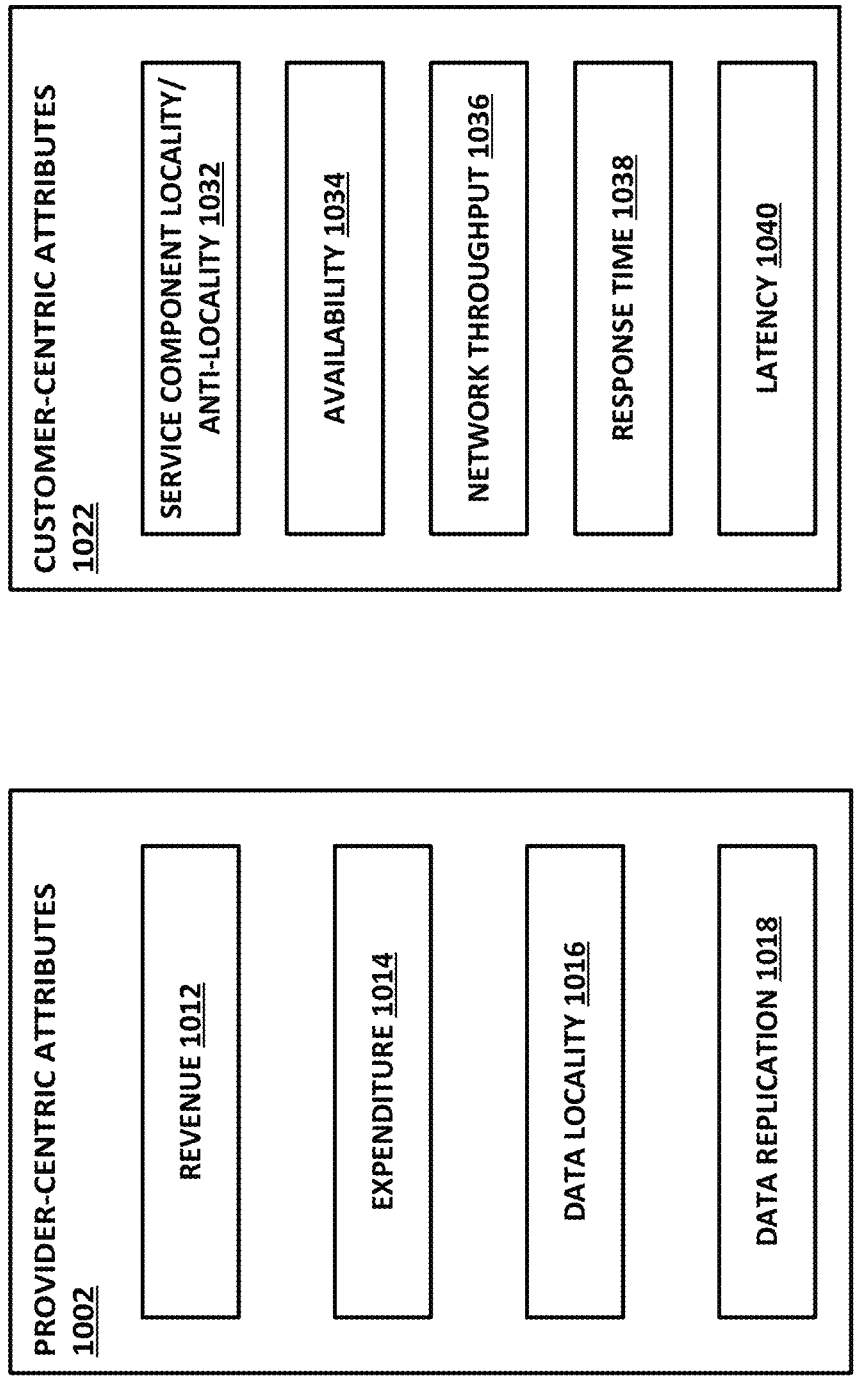
FIG. 10 illustrates example attributes for managing computing infrastructure resources and workloads, according to one or more examples of the present specification.
Figure 11:
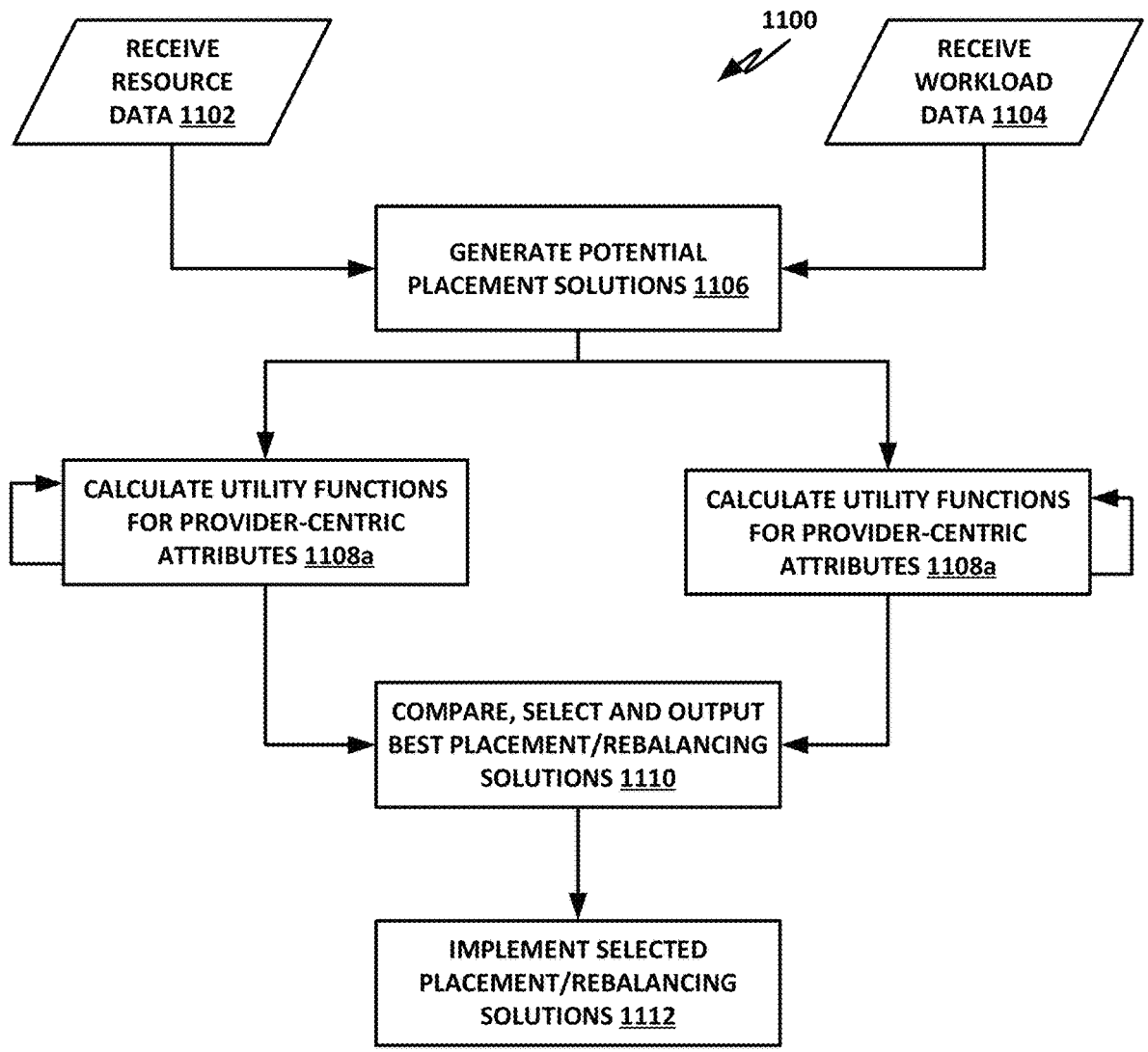
FIG. 11 illustrates an example process for managing computing infrastructure resources and workloads, according to one or more examples of the present specification.

FIG. 4 is a flowchart of a utility calculation 312, according to one or more examples of the present specification. Note that although this sub process is disclosed as a concrete example of a utility calculation, it should be understood to be a nonlimiting example. Also note that additional details of a utility calculation are illustrated in FIGS. 9 through 11.

In utility calculation phase 312, the utility or benefit may be calculated for each solution iteratively, and may be normalized to a value between $\{0, 1\}$. The resource provider objectives (for example, gross profit, resource utilization, data localization, and others) may be quantified into the provider utility. Service customer objectives, such as latency and throughput experienced by the user, runtime of the service, and others, may be quantified into the customer utility. Further examples of provider utility and customer utility are illustrated in FIG. 10.

A structured multi-attribute utility theory may be used for managing trade-offs among the multiple objectives, because it accounts for inherent hierarchy and relative importance of objectives under consideration. This model also captures accurate estimates of the utility scores. The total utility of a placement may include a weighted function of the provider utility and customer utility. The greater the utility, the higher the benefit of the placement.

Utility calculation 312 receives as an input an array of possible solutions 402.

In block 404, the system calculates the provider utility. In block 408, the system calculates the customer utility.

The provider utility and customer utility are provided as inputs to block 412, wherein the system calculates total utility.

Total utility 416 is provided as an output of utility calculation 312.

Figure 5:
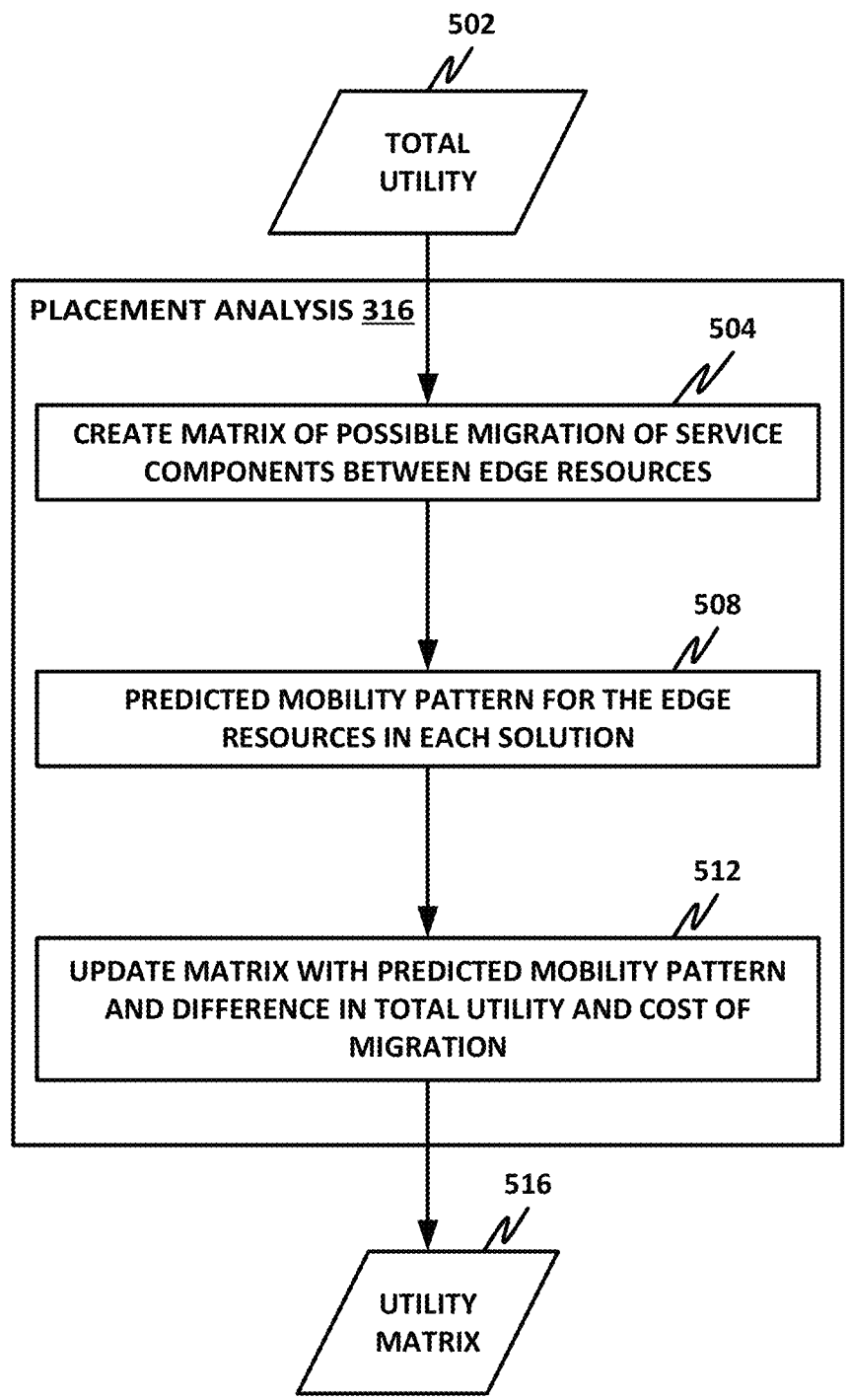
FIG. 5 is a flowchart of a placement analysis, according to one or more examples of the present specification.

FIG. 5 is a flowchart of a placement analysis, according to one or more examples of the present specification. Placement analysis 316 receives as an input total utility 502, which may be in one example, the total utility 416 at the output of FIG. 4.

In placement analysis phase 316, a matrix is created of possible migration of service components due to mobility of edge resources and the cost for this migration. An understanding of the underlying mobility pattern of the edge resources may be used to predict movement for each mobile resource. Comparisons may be made between the possible alternative placements by using the predicted mobility pattern of the resources. The utility difference between the placement solutions and the cost of migrating the service between those placement solutions is also considered.

Mathematically, the placement utility may be represented as:

$$p_{turn} * (utility_{diff} - cost_{migrate})$$

In this formula, $P_{turn}$ is the probability of a mobile resource to change the direction of its movement.

$utility_{diff} = utility_{current} - utility_{new}$, which is the utility difference between the current and new placement of the service chain.

$cost_{migrate} = p_{current} - p_{new} + T_{pause} * cost_{violations}$ which is the cost of migration of a service chain. This is based on $p_{current}$ (current profit for the provider in the current placement), $p_{new}$ (gross profit for the provider in the new placement), $T_{pause}$ (time taken to make the migration during which services may be paused), and $cost_{violations}$ (cost of any performance violations that occur during the migration, for example, remuneration that may need to be made to the user in compensation for the violation).

$d_{diff} = d_{staticresource} - T_{pause} * velocity$, which is the difference between the distance of the nearest static resource distances from possible change of direction point ($d_{staticresource}$) and the distance covered by the mobile resource during the time taken to migrate the service given by $T_{pause}$ (time taken to make the migration during which services were paused) and velocity (estimated velocity of the mobile resource).

In block 504, the system creates a matrix of possible migration of service components between edge resources.

In block 508, the system computes a predicted mobility pattern for the edge resources in each solution. This predicted mobility pattern could include, for example, with regard to FIG. 2, whether vehicle 204 will proceed straight along roadway 206 or will turn right. As an illustrative example, the probability that a vehicle will proceed straight may be considered en grosse approximately 50%, whereas the probability that a vehicle will take a right or left turn may be considered en grosse approximately 25%. Such statistical mobility models exist in the art, and this particular model which considers a 50% probability of proceeding straight and a 25% probability for each of a right or left turn is only one nonlimiting example. Also note that in this case, the model yields an aggregate probability of only 75% instead of 100%. This does not, however, invalidate the model. Such models are commonly used in other arts.

In block 512, the system updates a matrix with predicted mobility patterns and difference in total utility cost of migration for each mobility pattern. For example, in FIG. 2, a utility cost may be calculated for a right turn and a utility cost may be calculated for vehicle 204 proceeding straight ahead. Because the probability of these paths are 0.25 and 0.5, respectively, the total utility calculation for each placement may be multiplied by the respective probability, or in other words, 0.25 times the calculated utility of migrating to base station BS6 or BS7 with an associated service chain, and 0.5 times the utility of a migration to base station BS1 or BS2 with an associated service chain.

In block 512, the matrix is updated with predicted mobility pattern and difference in total utility and cost of migration.

The output of placement analysis 316 is utility matrix 516.

Figure 6:
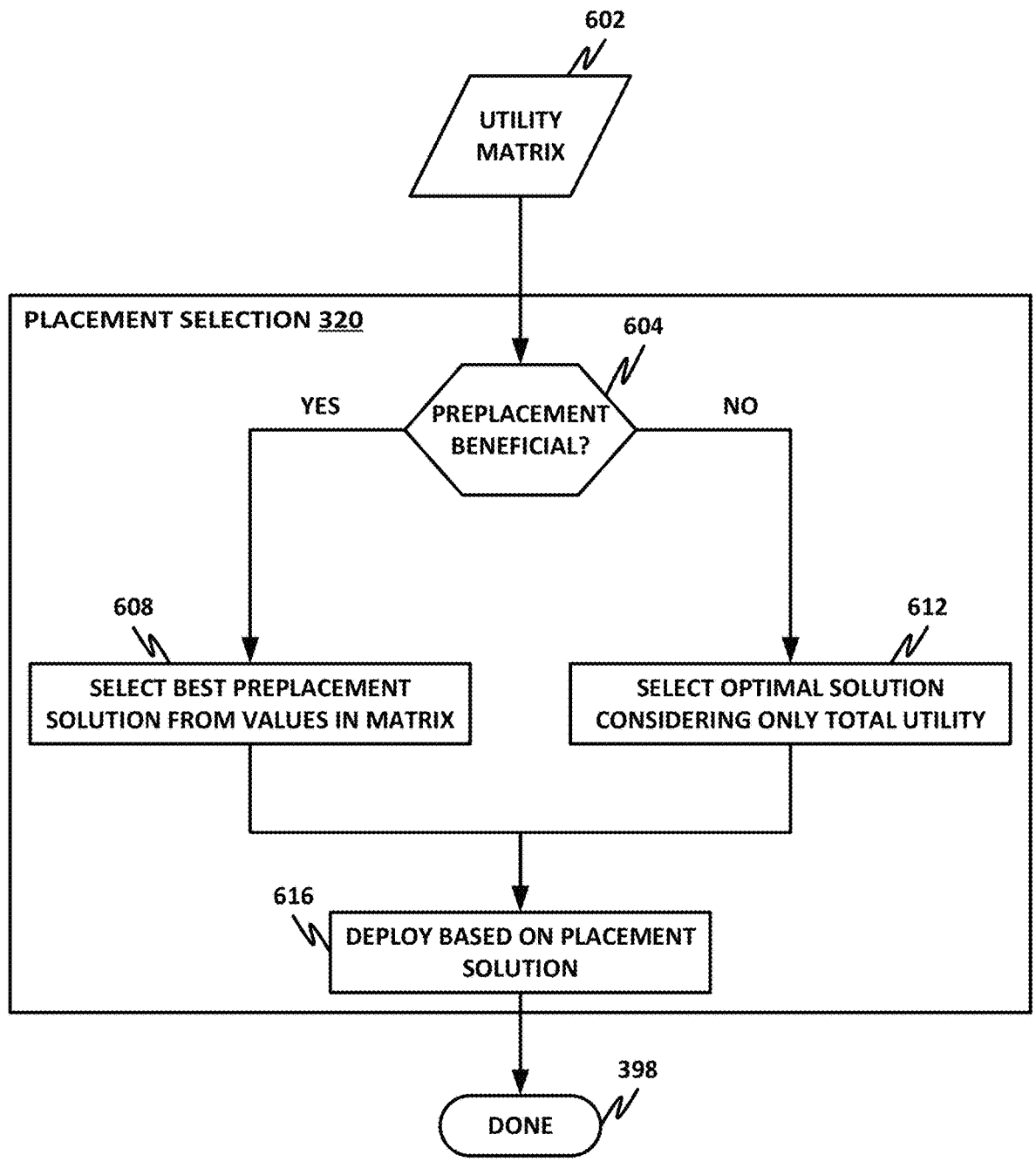
FIG. 6 is a flowchart of a placement selection, according to one or more examples of the present specification.

FIG. 6 is a flowchart of a placement selection 320, according to one or more examples of the present specification. Placement selection 320 receives as an input utility matrix 602, which may be, by way of nonlimiting example, utility matrix 516 of FIG. 5.

In placement selection phase 320, one goal may be to select the placement for the service chain that is most advantageous in terms of costs involved. Using the output from the placement analysis phase 316 (e.g., utility matrix 602), the advantage of pre-placing a service component according to the movement of the mobile resource is calculated and one placement solution is selected.

In decision block 604, the system determines for each potential placement whether the placement is beneficial.

If the placement is not beneficial, then in block 612, the system selects an optimal solution, considering only total utility.

If the placement is beneficial, then in block 608, the system selects a best placement solution from the values in the matrix.

Stated otherwise, the system determines whether the benefit of pre-placement outweighs the cost of pre-placement. If there is no substantial benefit to pre-placement, then service chains may simply continue to be optimized according to known methods. However, if pre-placement yields a benefit, then pre-placement will be used.

In block 616, the system deploys the service chain based on the calculated placement.

Figure 7:
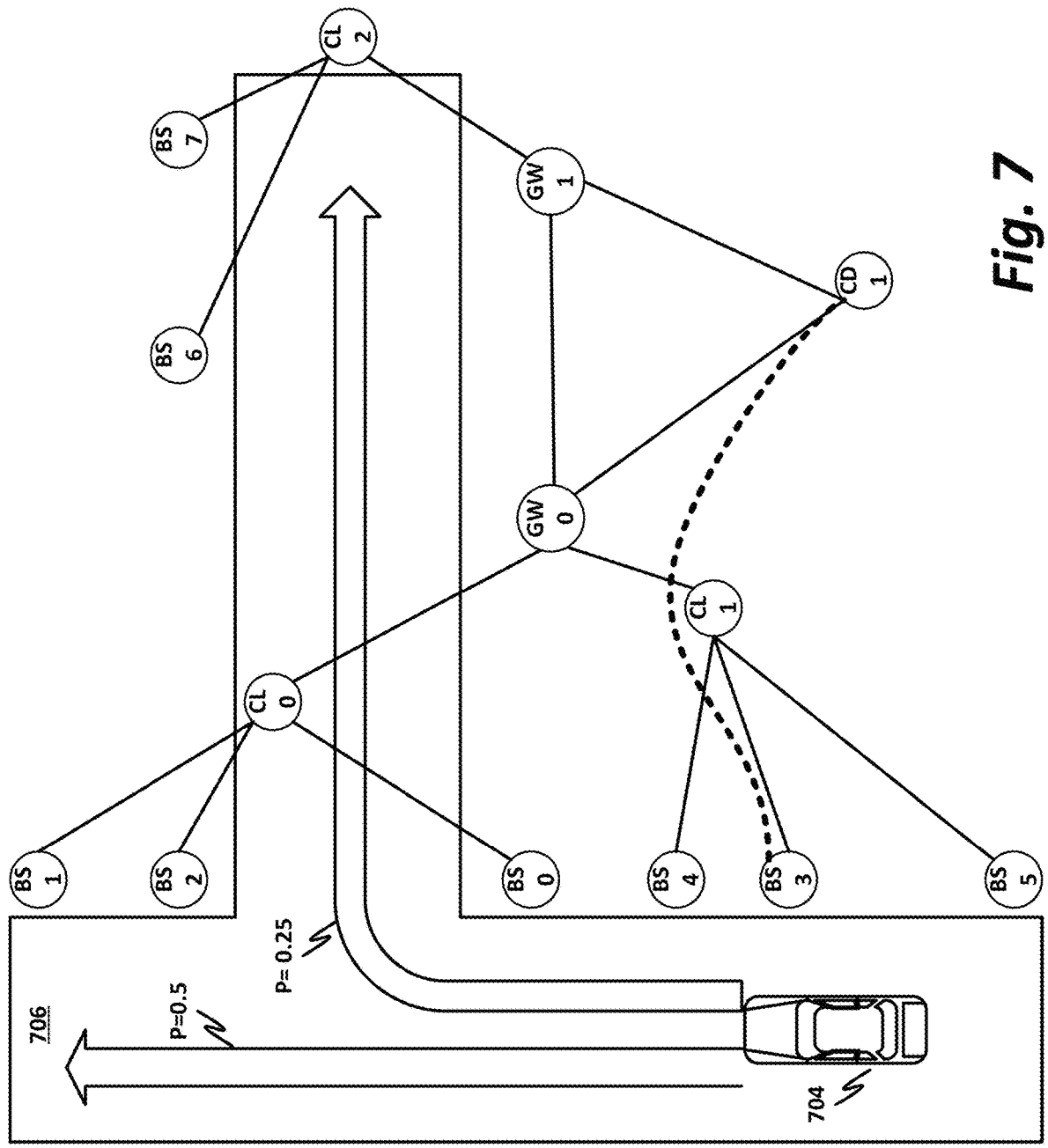
FIG. 7 is a block diagram illustrating application of the method of FIG. 3 to a mobile computing scenario, according to one or more examples of the present specification.

FIG. 7 is a block diagram illustrating application of method 300 of FIG. 3 to a mobile computing scenario, according to one or more examples of the present specification. As before, vehicle 704 is proceeding along roadway 706, and a passenger within vehicle 704 is operating user equipment to access mobile network resources.

As discussed above, the probability that the user will continue forward is 0.5, while the probability that the user will turn is 0.25. As noted above, this is a simple probability algorithm that is nevertheless useful. In other embodiments, other probability logarithms may be used.

In FIG. 7, dynamic adaptation of the utility of the placement is enabled to intelligently pre-place service components closer to mobile resources. Because the matrix is pre-computed, this decision can be made almost instantaneously, thus enabling better performance of the distributed infrastructure. Here, the mobility model is taken as an input in the probability of vehicle 704, wherein each possible route is considered.

Figure 8:
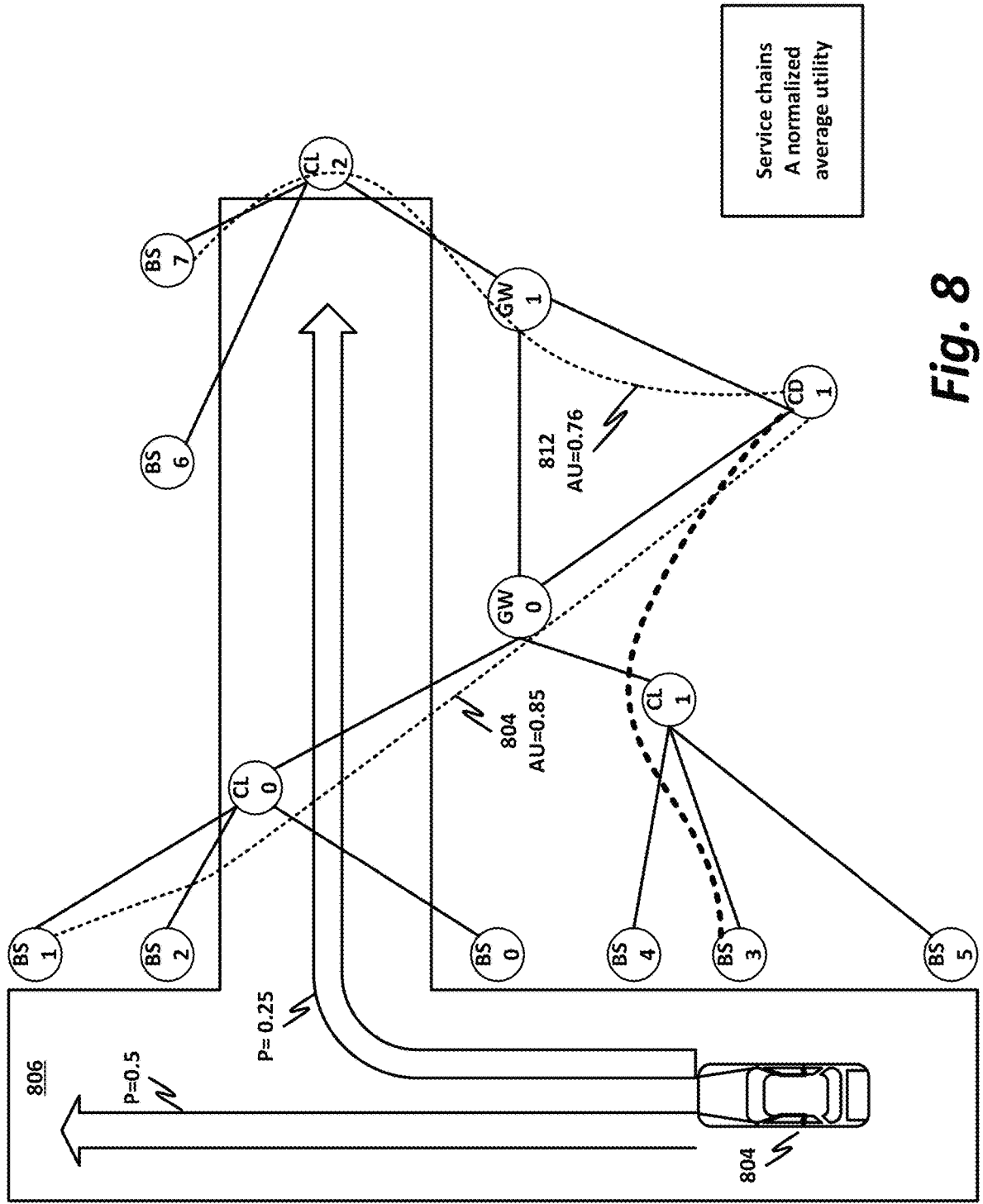
FIG. 8 illustrates two possible service chain placement options, according to one or more examples of the present specification.

FIG. 8 illustrates two possible placement options, namely service chain placement 804 and service chain placement 812, according to one or more examples of the present specification.

Service chain placement 804 includes base station BS1 and cloudlet zero CL0, communicatively coupled to cloud CD1. Service chain placement 812 includes base station BS7 and cloudlet two CL2 communicatively coupled to cloud CD1. Gateway GW0 facilitates communication in service chain placement 804, while gateway GW1 facilitates communication in service chain placement 812.

By way of example, the average utility of placement 804 is computed to be 0.85. The average utility of placement 812 is computed to be 0.76. In other words, placement 812 may have a higher overall utility than placement 804, but because placement 804 is twice as likely as placement 812, placement 804 has a higher average utility. Thus, as the user within vehicle 804 proceeds along roadway 806, the system pre-computes an average utility for each predicted service chain placement. Based on this precomputed average utility, the system may pre-place service chain placement 804, so that when the user in vehicle 804 switches from base station three to base station one, the service chain placement is already in place, and the user's mobile experience is not disrupted.

FIG. 9 illustrates an example computing infrastructure resource-workload manager, according to one or more examples of the present specification.

Computing infrastructure resource-workload manager (or orchestrator) 920 may be implemented in hardware or software, or both. A hardware implementation may include various ASIC or FPGA programmed with the operation logic. A software implementation may include various modules or routines of instructions executable by computer processors. A hardware/software implementation may include elements of both types.

As will be described more fully below, the management or orchestration technology of the present disclosure may define these benefits as utility functions for improving overall infrastructure throughput. The management or orchestration technology of the present disclosure may implement utility functions for a wide array of attributes (including provider-centric and customer-centric attributes) to formally quantify a potential placement/rebalancing solution. In embodiments, non-additive utility functions may be employed, which give the advantage of considering the trade-offs between the attributes instead of considering them as independent attributes. Further, in embodiments, these functions may be implemented for the placement/rebalancing phase of the machines instead of the negotiation phase of the SLA for a better understanding of the way a placement affects the service provider and the customer.

As shown in various embodiments, computing infrastructure resource-workload manager 920 may include potential placement solution generator (or simply, placement solution generator) 902, one or more utility function generators 904-906, an analyzer 908 and a resource allocator 910, communicatively coupled to each other as shown. Potential placement solution generator 902 may be configured to receive resource data 912 and workload data 914, and in response, generate potential placement solutions, i.e., placements or allocations of various resources for the various workloads. Pre-placement analyzer 930 performs a pre-placement computation as illustrated, for example, in method 300 of FIG. 3, and elsewhere throughout this specification.

In embodiments, resource data 912 may set forth the resources of the computing infrastructure (i.e., resources-services landscape), and workload data 914 (service requests) may set forth the computing services to be provided to various customer client systems (optionally, including service level requirements). In embodiments, both the resources-services landscape and the service requests can be described as a graph. Nodes may be used to detail the entities (compute, network and storage physical and virtual elements) and edges may be used to denote their relationships. For the service requests, the graph may indicate a possible topology, the resources and services landscape may be an actual topology—which can even be enhanced with indicators from telemetry (such as utilization and saturation values indicating hot and cold spots in the landscape). In embodiments, one or more utility function generators 904-906 may include utility function generator A 904 and utility function generator B 906. Utility function generator A 904 may be configured to calculate values of various provider-centric attributes for the various potential placement solutions, and utility function generator B 906 may be configured to calculate values of various customer-centric attributes for the various potential placement solutions.

In embodiments, analyzer 908 may be configured to process and compare the values of the provider-centric attributes and values of the customer-centric attributes, and select the best or optimal placement solution. In embodiments, analyzer 908 may output the selected placement solution for resource allocator 910. In embodiments, resource allocator 910 may be configured to allocate the various resources of the computing infrastructure to provide computing services to the various client systems, in accordance with at least the selected placement solution.

FIG. 10 illustrates example attributes for managing computing infrastructure resources and workloads, according to one or more examples of the present specification. As shown, in various embodiments, provider-centric attributes 1002 may include revenue attribute 1012, expenditure attribute 1014, data locality attribute 1016 and data replication attribute 1018. For customer-centric attributes 1022, they may include service components locality/anti-locality attribute 1032, availability attribute 1034, network throughput attribute 1036, response time attribute 1038 and latency attribute 1040. In embodiments, revenue attribute 1012 may detail an amount of credit ($) the provider would gain by hosting a service (with a particular placement solution).

For example, revenue attribute 1012 may be calculated based on type & amount of nodes in the graph of workload data 914 detailing the service request. In embodiments, expenditure attribute 1014 may detail the total cost of ownership (TCO) in credits ($) of the resources (e.g. CPUs, disks) in the resource-service landscape which are (possibly) needed to handle the service request (with a particular placement solution). Together, revenue attribute 1012 and expenditure attribute 1014 may define a profit attribute (for a particular placement solution): $\mathcal{U}(P)$.

In embodiments, data locality attribute 1016 may detail the distance or access frequency between the infrastructure's compute resources and (possibly pre-existing) storage entities (for a particular placement solution). In embodiments, values of data locality attribute 1016 may be calculated by looking at distances between compute and storage nodes in the graph of resource data 912. This attribute assumes moving data around incurs a cost. The attribute may be named: $\mathcal{U}$ (D). In embodiments, data replication attribute 1018 may detail the number of possible data/storage replicas the infrastructure has to deal with for fault-tolerance/high availability/performance issues (for a particular placement solution). Values of data replication attribute 1018 may be calculated based on the number of duplicate nodes in the resource landscape graph of resource data 912. The attribute may be named: $\mathcal{U}$ (R).

In embodiments, service components locality/anti-locality attribute 1032 may detail the requirements of the service to be hosted in one or in separated locations (geo, rack, server etc.) (for a particular service request/workload). The requirements may be set forth e.g., in the service request graph of workload data 914. In embodiments, values of service components locality/anti-locality attribute 1032 may be calculated based on the distance between nodes in the graph. The attribute may be named: $\mathcal{U}$ (R).

In embodiments, availability attribute 1034 may detail the desired availability of the service (of a particular service request/workload). In embodiments, it may be defined as gold, silver, bronze level offerings, and hence available as an attribute in the service request graph of workload data 914. In embodiments, values of availability attribute 1034 may be calculated based on replicated nodes in the graph. The attribute may be named: $\mathcal{U}$ (A).

In embodiments, network throughput attribute 1036 may detail the desired minimum network throughput the service needs (for a particular service request/workload). The minimum network throughput the service needs may be located in the service request graph of workload 914. In embodiments, network throughput attribute 1036 may be calculated based on the edge between two particular nodes. The attribute may be named: $\mathcal{U}$ (T).

In embodiments, response time attribute 1038 may detail the time at which a task is to be completed—can include notions of runtime (for a particular service request/workload). The time at which a task is to be completed may be located in the service request graph of workload data 914. In embodiments, response time attribute 1038 may be calculated based on the number of entities minimally involved in ensuring the service availability. The attribute may be named: $\mathcal{U}$ (Rt).

In embodiments, latency attribute 1040 may detail the maximum desired latency between two service components (for a particular service request/workload). The maximum desired latency between two service components may be located in the service request graph of workload data 914. In embodiments, latency attribute 1040 may be calculated based on the nodes and edge attributes (possible bandwidth current usage) between nodes in the landscape graph of resource data 912. The attribute may be named: $\mathcal{U}$ (Lt).

In embodiments, all attributes represent the context of the current running service and resources of the landscape. This includes notions of which physical resources are available and which service components are already running.

Embodiments of these attributes will be further described below, after the description of an example process for managing computing infrastructure resources and workloads.

FIG. 11 illustrates an example process for managing computing infrastructure resources and workloads, according to one or more examples of the present specification. As shown, process 1100 for managing computing infrastructure resources may include operations performed at blocks 1102-1112. In embodiments, the operations may be performed by potential placement solution generator 902, utility function generators 904-906, analyzer 908 and resource allocator 910, of computing infrastructure resource-workload manager (or orchestrator) 120.

Process 1100 may begin at blocks 1102 and 1104. At blocks 1102 and 1104, resource data denoting resources of the computing infrastructure, and workload data denoting service requests of the client systems for computing services may be received.

Next, at block 1106, potential placement solutions of the resources of the computing infrastructure for the various service requests of the workload may be generated.

At blocks 1108a and 1108b, the values for the provider-centric attributes and the values for the customer-centric attributes may be computed for each of the placement solutions. The operations at blocks 1108a and 1108b may be repeated as many times as necessary to have the values of the provider-centric and customer-centric attributes computed for each of the placement solutions.

In embodiments, the calculation of the utility functions for one solution based on these attributes, may be represented by $\mathcal{A} = \mathcal{A}_1 \cup \mathcal{A}_2 = \{\alpha_1 \ldots \alpha_i \ldots \alpha_k\}$, with k≥2 associated with our placement/rebalancing decision problem. Here subset $\mathcal{A}_1$ may contain all provider-centric attributes and subset $\mathcal{A}_2$ may contain all customer-centric attributes. For each attribute, the service provider/customer may also provide a weight or a priority value to indicate the importance of the attribute ($\alpha_k$) along with additive weight that stores dependence on other attributes ($\beta_k$). Additionally, the preferences for these attributes are not hard constraints, and they evolve with each request and incorporate the trade-offs or relational operations between the attributes.

In embodiments, once the sub-utility values for the attributes are available, a decomposed assessment may be used to calculate the two utilities of a placement/rebalancing solution, namely $\mathcal{U}_s$ which stands for the service provider-centric utility function and $\mathcal{U}_e$ which stands for the customer-centric utility function. These, in turn, may be calculated based on a multiplicative function (as attributes may be considered inter-independent) on the k conditional utilities for each attribute.

For the provider utility, $\mathcal{U}_s$ may be defined as:
$$\mathcal{U}_s = (\alpha_1 * \mathcal{U}(P) + \beta_1) * (\alpha_2 * \mathcal{D}(D) + \beta_2) * (\alpha_3 * \mathcal{U}(R) + \beta_3)$$

And for the customer utility, $\mathcal{U}_e$ may be defined as:
$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

Thus, the methodology efficiently captures and implements the preferences of the service provider as well as the customer as part of the orchestrator module. The formal representation and calculation of the impact of deployment for the service provider and the customer can effectively contribute towards efficient placement/rebalancing solution decision making. For example, for a set of service placement options the customer and utility can be mapped on a plane. This plane may be computed by the computing infrastructure resource-workload manager (orchestrator).

Still referring to FIG. 11, at block 1110, the computed values of the provider-centric and customer-centric attributes computed for each of the placement solutions may be analyzed/compared, and a best/optimal placement solution may be selected based at least in part on the values of the provider-centric and customer-centric attributes of the various placement solutions. In embodiments, on selection, the selected placement solution may be outputted.

In embodiments, placement groups can be seen as groupings of possible placements based on criteria like "best effort" to "dedicated and overprovisioned" service delivery. The trade-off between customer and provider utility may be considered in the context of the resources and services already in place.

In embodiments, the decision (analyze, compare, and select) may be made by choosing the option which allows a balanced trade-off dependent on the business model. For example, a higher value of the customer-centric utility may be considered as implying a lower profit for the service provider leading to a low value of the provider-centric utility. Thus, a balance may be made and the focus may be on choosing a placement which provides a good value for both the provider-centric and the customer-centric utility function. By projecting the minimum/maximum thresholds for e.g., the provider and the customer utility and the desired placement group (e.g., best effort vs. random) on the analysis plane the possible "valid" candidates can be highlighted and hence actuated upon. In alternate embodiments, other options like multi-level optimizations can be applied to this analysis plane too.

Furthermore, the methodology may allow the orchestrator to adapt, as the business incentive changes, to favor one attribute or one sub-utility function as desired. In addition, the quantification of these attributes and the formal expression of the utility functions for the provider and customer pave the way for the application of optimization algorithms and techniques which take into account business objectives of both the service provider customer. At block 1112, resources of the computing infrastructure may be allocated to the various service requests of the workload, in accordance with the selected placement solution. Allocation of resources may include, for example, but are not limited to, pinning virtual machines, containers, or tasks to a CPU core, block and or object storage object association with disks and virtual network elements to physical network entities (NICs, switches, and so forth).

Referring now to FIG. 10 again, embodiments of the provider-centric attributes 1002 and customer-centric attributes 1004 with further details will be described.

I. Provider-Centric Attributes 1002.

a) Revenue 1012. In embodiments, the service provider may be considered as having a rate for provisioning the request depending on its actual runtime $T_r$ (in hours) which depends on the placement of the request and can be predicted/is known from the SLA. There is an hourly rate related with each VM flavor (which defines the sizes for memory, disk, number of cores etc.) denoted as $R_{flavor}$ and every SLA template denoted as $R_{SLA}$. Additionally, each fault tolerant procedure e∈E that can be implemented by the service provider may be represented by a tuple {Name of Procedure,$R_e$,$\lambda$}. E may be defined as a set of fault tolerant procedures which can be implemented. These can range from configuring space and time redundancy, enabling matrix or vector-level checksum, pre-emptive job migration as well as defined exception handling. Here $R_e$ may be the rate at which this procedure is available, determined by calculating the reserved extra resources value and is a 0-1 value indicating whether this procedure has been requested by the customer or not.

Thus, for these embodiments, revenue may be considered as composed of three parts:
  i. Service price per VM flavor=$T_r * \Sigma_{VMs} R_{flavor}$
  ii. SLA price per SLA template=$T_r * \Sigma_{SLAs} R_{SLA}$
  iii. Failure Tolerance Cost=$T_r * \Sigma_{|E|} \Delta_e * R_e$ b) Expenditure 1014. In embodiments, the service provider may be considered as incurring cost when provisioning a request related to each requested resource. The hourly rate for provisioning the node may be denoted as $R_n$ and its service/maintenance rate may be denoted as $M_n$. The number of cores on the VM v is indicated by $cores_v$ and on the host server as $cores_n$. Additional costs may be related to powering and cooling the systems and the mean power cost is power $/kWh. For every SLA Violation, j∈J represents the cost paid for the violation and J represents the corresponding number of times this violation occurs. Thus, for these embodiments, expenditure may be considered as composed of:

i. Server and Equipment Costs (depending on cores in VM and on the host server) = $T_r * |N_{compute}| * \frac{cores_v}{cores_n} R_n$, where n is in the compute resource in the infrastructure ii. Service and Maintenance Cost = $T_r * M_n$ iii. Power Consumption and Cooling Costs = $\frac{cores_v}{cores_n} * T_r * \overline{power} * R_n$ iv. Network Connections Costs = $T_r * \sum |N_{networkElement}| * R_{networkElement}$, where a network element can be a switch, a router etc. in the network plane represented by set $N_{networkElement}$ with provisioning rate $R_{networkElement}$ v. SLA Violations = $\sum_{j \in \mathcal{J}} j * \bar{J}$.

Profit. In embodiments, using the above stated definitions, utility profit may be defined as p=Revenue−Expenditure to represent both the Revenue and Expenditure. Its utility function may be modelled on $$p(\%) = \frac{p}{\text{Expenditure}} * 100.$$

When depicting this as a utility function, a minimum profit level might be set by the service provider, represented by $p_{\{min\}}$ which must be attained. Thus, for these embodiments, the utility function may be mathematically formulated as below:

$$\mathcal{U}(P) = \begin{cases} p(\%), & p > p_{\{min\}} \\ 0, & p = p_{\{min\}} \\ p(\%), & p < p_{\{min\}} \end{cases}$$

c) Data Locality 1016. In embodiments, this attribute may define the degree to which the placement must consider data locality for node n over time $\mathcal{T}$ and is denoted by $\mathcal{D}_n$. The information may be derived from these variables:
  i. The number of data packets to be transferred $\delta$
  ii. Rate of transmission f(n)
  iii. The one-hop packet transmission cost to/from node n over the entire time it takes to transmit. This includes transmission from node $n_1$ (which is the data producing node) indicated by $w(n_1,n)$ and transmission to node (which is the data storing node) indicated by $w(n,n_2)$.
  iv. The distance between the nodes indicated by the number of switches that lie on the shortest path indicated by $d(n_1,n)$ and $d(n,n_2)$, where $n_1,n_2$ are the data producing and data storing nodes, respectively. [Note: By using the number of switches, the nodes may be allowed to be in different ranks or in different data centers.]

v. Access Frequency of these data packets node n over time period τ given by $$a\frac{\tau}{n}.$$

The total cost of transferring the data to node n denoted by $C(\mathcal{D}_n)$ and the access frequency of the data $$a\frac{\tau}{n},$$

may determine whether the data should be localized on node n or not. As $$C(\mathcal{D}_n) \propto \frac{\delta}{f(n)} * (w(n, n_1) * d(n, n_1) + w(n, n_2) * d(n, n_2)),$$

the data locality for the node can be defined as a multiplicative function of access frequency and cost. Thus, for these embodiments, the utility function for data locality of a placement, depicted by $\mathcal{U}(\mathcal{D})$ may be given by:

$$\mathcal{U}(\mathcal{D}) = \sum \mathcal{D}_n = \sum a\frac{\mathcal{T}}{n} * C(\mathcal{D}_n)$$

In some embodiments, the various values can also be derived from the table below:

| $C(\mathcal{D}_n)$: Cost | $a\frac{\mathcal{T}}{n}$: Access Frequency | $D_n$: Data Locality |
|---|---|---|
| Low | Low | Not Required |
| Low | High | Not Required |
| High | Low | Not Required |
| High | High | Required |

[Notes: 1) It is possible that $n_1 == n_2$.
2) Partitioning of data is not considered for this formulation.
3) If $n_1 == n_2$ or $n == n_2$, then $d(n, n) = 0$ and $w(n, n) = 0$.

d) Data Replication 1018. In embodiments, this attribute may define the number of replications that should ideally be maintained by service providers to ensure performance. Once the cumulative access frequency of the data increases for all nodes n in a particular data center x∈X over time period T and goes beyond a threshold θ, the data may be considered for replication. X is the set of data centers and x defines one such data center. The value of may be decided by the service-provider and depend on the cost of replication. This can be stated as:

$$\sum\nolimits_{n \in x} a\frac{\mathcal{T}}{n} > \theta \Rightarrow \text{replication}$$

II. Customer-Centric Attributes 1022.

A) Service component locality/anti-locality 1032. In embodiments, for service component locality requirements, including geo-location, hybrid computing and IoT scenarios, a modified request graph may be created by using the concepts of edge contraction. Embodiments may make use of Edmund's blossom as presented for matching algorithms in any graph. See, for example, J. Edmonds, "Paths, Trees, and Flowers," in Classic Papers in Combinatorics, Springer, 2009, pp. 361-379, for further details. For example, if two nodes in the request graph need to be on the same service component, the edge between them on the graph may be contracted, so that the orchestrator now sees one node, ensuring that both original nodes are assigned to the same service component.

(b) Availability 1034. In embodiments, availability of node n may be represented as $$A\frac{t}{n}$$

and may be mapped to the capacity $$C\frac{t}{n}$$

of the node, as shown:

$$A\frac{t}{n} = K * C\frac{t}{n}$$

where K is a constant used to normalize and map the value of capacity to availability.

In embodiments, a linear utility function may be defined for availability of node n indicated by $\mathcal{U}(A)$ over the run-time. The values of the normalization variables $y_1$ and $y_2$ used to normalize the utility values between [0, 1] may be derived by replacing best and worst values for the availability as acceptable by customer, as the boundary conditions will be $\mathcal{U}_n(A_n)^{worst}=0$ and $\mathcal{U}_n(A_n)^{best}=1$ at all time-instances.

$$\mathcal{U}(A) = \sum_{t \in T_r} y_1 * A_n^t + y_2$$

(c) Network Throughput 1036. In embodiments, the network utility links may be studied in context of the communication links between different resources. As stated before, $l \in \mathcal{L}$ may be a communication link within communication link set $\mathcal{L}$ with capacity $c_l$. Node n may transmit a flow over a set of the links, indicated by path P at the source rate of $f_n$ (the transmission rate) whilst ensuring capacity bounds and within the utilization parameters of each network interface card encountered in path P. Thus, a utility of the node may be represented as $\mathcal{U}(T)$ which may be maximized over all nodes. This utility function may be defined as a log function, since it may be concave, differentiable, and non-decreasing.

$$\mathcal{U}(T)=y_3 \log(f_n) s.t: y_3 > 0 \text{ and } f_n \leq c_l \forall l \in P$$

Response Time 1038. In embodiments, response time $t_r$ may refer to the time at which a task is completed and $T_r$ is the time taken for the same. Arrival time may be represented as $t_a$, expected completion time value as $t_e$. Also, some amount of delay may be acceptable to the customer beyond expected completion time of the job indicated by s. In an ideal situation, the relation between these time instances can be shown: $t_a \le t_r = t_e$. Thus, for these embodiments, the utility function for response time can then be presented as:

$$\mathcal{U}(Rt) = \begin{cases} 1, & t_r \le t_e \\ -y_4(t_r - s), & t_e + s < t_r \\ -1, & \text{otherwise} \end{cases}$$

(e) Latency 1040. In embodiments, the latency experienced for a workload may be mainly dependent on serialization, queueing delay, routing latencies and propagation delay. This may be modelled by using the factors below:

i. Number of shared cores or 'Degree of Core Isolation' may be denoted by $I_n$ for node n as:

$$I_n = \frac{cores_n}{\sum_v cores_v}$$

ii. Serialization Latency denoted by $L_s$ may be dependent on data sizes transferred (total denoted by p and f(n) which is the transmission rate).

$$L_s = \sigma_1 * \frac{\rho}{f(n)}$$

iii. Queueing Latency denoted by $L_q$ may be a summation of queuing delay $Q_n$ for each node n over response time $T_r$ (The delay experienced due to a resource or node being saturated, indicated by its saturation value $$S \frac{t}{n}$$

at time t and unable to process further requests).

$$L_q = \sum_n Q_n = \sigma_2 \sum_n \sum_{t_a \le t \le t_r} S\frac{t}{n}$$

iv. Propagation Delay denoted by $L_p$ may be dependent on the summation of the geographical length covered by the request (distance to user):

$$L_p = \sigma_3 \sum_p len(l), \forall l \in P, \forall P$$

v. Routing Latency denoted by $L_r$ may be dependent on the latency due to the various switches and routers.

$$L_r = \sigma_4 * |\mathcal{N}_{routers}|$$

$\sigma_1$, $\sigma_2$, $\sigma_3$, and $\sigma_4$ are constants used to relate the terms in the definitions.

$\mathcal{N}_{routers}$ defines the set of routers present as resources.

Thus, the utility function for latency, denoted by $\mathcal{U}(Lt)$ for acceptable latency l given in SLA and penalty can be defined as:

$$\mathcal{U}(Lt) = y_5 * \sum_n I_n * e\left(\frac{y_6}{L_s + L_q + L_p + L_r}\right)$$

Variables y1, y2, y3, y4, y5, and y6 are constants for normalization.

III. Provider and Customer Utility.

For these embodiments, the provider-centric utility function for a potential placement/rebalancing solution (eq. (1)) may instead be expressed as follows:

$$\mathcal{U}_s = (\alpha_1 * \mathcal{U}(P) + \beta_1) * (\alpha_2 * \mathcal{U}(\mathcal{D}) + \beta_2) * (\alpha_3 * \mathcal{U}(R) + \beta_3)$$

$s.t. \alpha_1 + \alpha_2 + \alpha_3 = 1$

The customer-centric utility function for a potential placement/rebalancing solution (eq. (2)) may instead be expressed as follows:

$$\mathcal{U}_e = (\alpha_4 * \mathcal{U}(L) + \beta_4) * (\alpha_5 * \mathcal{U}(A) + \beta_5) * (\alpha_6 * \mathcal{U}(T) + \beta_6) * (\alpha_7 * \mathcal{U}(Rt) + \beta_7) * (\alpha_8 * \mathcal{U}(Lt) + \beta_8)$$

$s.t. \alpha_4 + \alpha_5 + \alpha_6 + \alpha_7 + \alpha_8 = 1$

Figure 12:
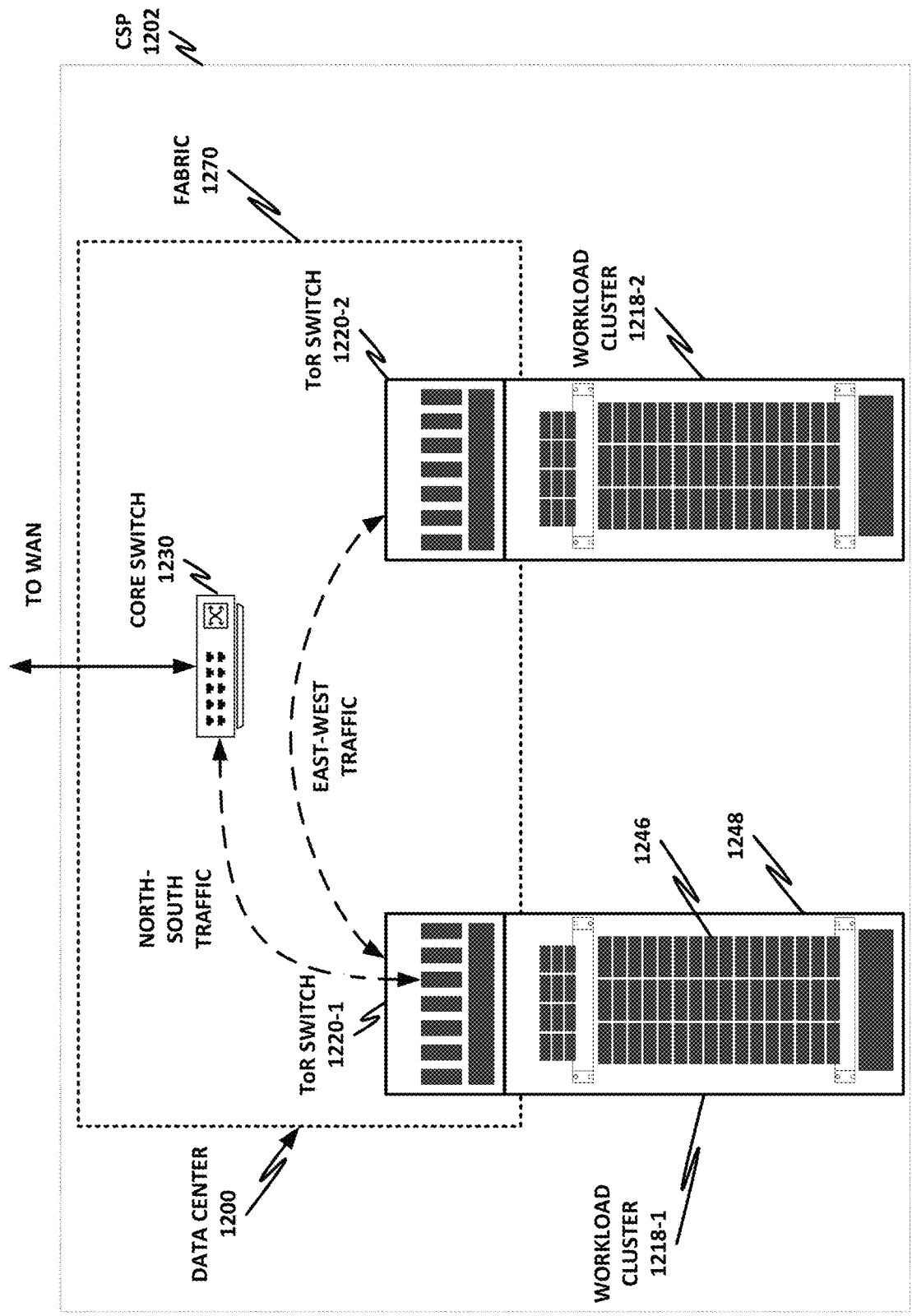
FIG. 12 is a block diagram of selected components of a data center with network connectivity, according to one or more examples of the present specification.

FIG. 12 is a block diagram of selected components of a data center with connectivity to network 1200 of a cloud service provider (CSP) 1202, according to one or more examples of the present specification. CSP 1202 may be, by way of nonlimiting example, a traditional enterprise data center, an enterprise "private cloud," or a "public cloud," providing services such as infrastructure as a service (IaaS), platform as a service (PaaS), or software as a service (SaaS). In some cases, CSP 1202 may provide, instead of or in addition to cloud services, high-performance computing (HPC) platforms or services. Indeed, while not expressly identical, HPC clusters ("supercomputers") may be structurally similar to cloud data centers, and unless and except where expressly specified, the teachings of this specification may be applied to either.

CSP 1202 may provision some number of workload clusters 1218, which may be clusters of individual servers, blade servers, rackmount servers, or any other suitable server topology. In this illustrative example, two workload clusters, 1218-1 and 1218-2 are shown, each providing rackmount servers 1246 in a chassis 1248.

In this illustration, workload clusters 1218 are shown as modular workload clusters conforming to the rack unit ("U") standard, in which a standard rack, 19 inches wide, may be built to accommodate 42 units (42U), each 1.75 inches high and approximately 36 inches deep. In this case, compute resources such as processors, memory, storage, accelerators, and switches may fit into some multiple of rack units from one to 42.

Each server 1246 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 1246 may be specifically dedicated to certain enterprise clients or tenants, while others may be shared.

The various devices in a data center may be connected to each other via a switching fabric 1270, which may include one or more high speed routing and/or switching devices. Switching fabric 1270 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 1246 increases, traffic volume may further increase. For example, each server 1246 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 1270 may be provided. Switching fabric 1270 is illustrated in this example as a "flat" network, wherein each server 1246 may have a direct connection to a top-of-rack (ToR) switch 1220 (e.g., a "star" configuration), and each ToR switch 1220 may couple to a core switch 1230. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 1246 may include an Intel® Host Fabric Interface (HFI), a network interface card (NIC), a host channel adapter (HCA), or other host interface. For simplicity and unity, these may be referred to throughout this specification as a "host fabric interface" (HFI), which should be broadly construed as an interface to communicatively couple the host to the data center fabric. The HFI may couple to one or more host processors via an interconnect or bus, such as PCI, PCIe, or similar. In some cases, this interconnect bus, along with other "local" interconnects (e.g., core-to-core Ultra Path Interconnect) may be considered to be part of fabric 1270. In other embodiments, the UPI (or other local coherent interconnect) may be treated as part of the secure domain of the processor complex, and thus not part of the fabric.

The interconnect technology may be provided by a single interconnect or a hybrid interconnect, such as where PCIe provides on-chip communication, 1 Gb or 10 Gb copper Ethernet provides relatively short connections to a ToR switch 1220, and optical cabling provides relatively longer connections to core switch 1230. Interconnect technologies that may be found in the data center include, by way of nonlimiting example, Intel® Omni-Path™ Architecture (OPA), TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. The fabric may be cache- and memory-coherent, cache- and memory-non-coherent, or a hybrid of coherent and non-coherent interconnects. Some interconnects are more popular for certain purposes or functions than others, and selecting an appropriate fabric for the instant application is an exercise of ordinary skill. For example, OPA and Infiniband are commonly used in high-performance computing (HPC) applications, while Ethernet and FibreChannel are more popular in cloud data centers. But these examples are expressly nonlimiting, and as data centers evolve fabric technologies similarly evolve.

Note that while high-end fabrics such as OPA are provided herein by way of illustration, more generally, fabric 1270 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 1270.

In certain embodiments, fabric 1270 may provide communication services on various "layers," as originally outlined in the Open Systems Interconnection (OSI) seven-layer network model. In contemporary practice, the OSI model is not followed strictly. In general terms, layers 1 and 2 are often called the "Ethernet" layer (though in some data centers or supercomputers, Ethernet may be supplanted or supplemented by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 13:
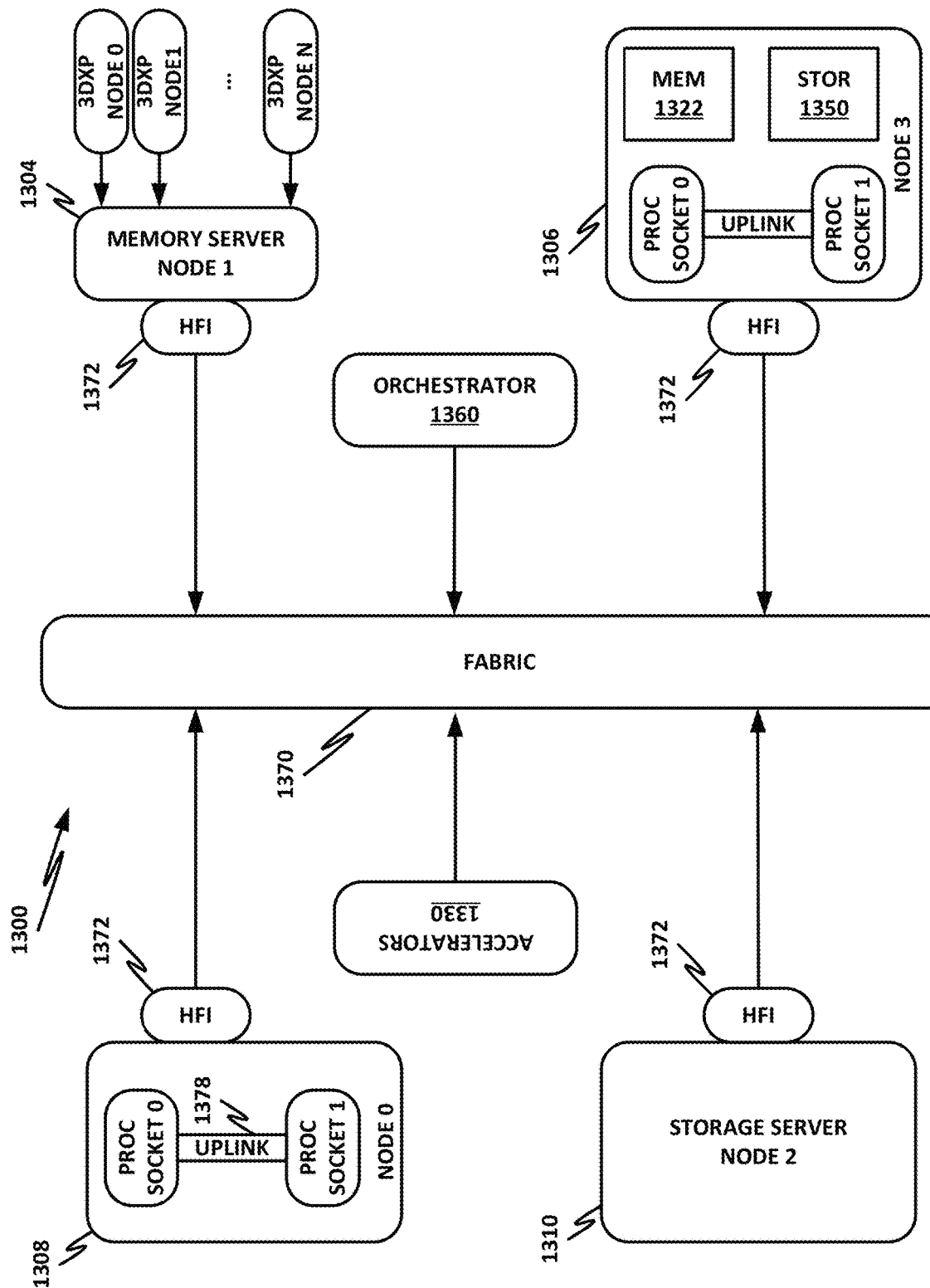
FIG. 13 is a block diagram of an end-user computing device, according to one or more examples of the present specification.

FIG. 13 is a block diagram of an end-user computing device 1300, according to one or more examples of the present specification. As above, computing device 1300 may provide, as appropriate, cloud service, high-performance computing, telecommunication services, enterprise data center services, or any other compute services that benefit from a computing device 1300.

In this example, a fabric 1370 is provided to interconnect various aspects of computing device 1300. Fabric 1370 may be the same as fabric 1270 of FIG. 12, or may be a different fabric. As above, fabric 1370 may be provided by any suitable interconnect technology. In this example, Intel® Omni-Path™ is used as an illustrative and nonlimiting example.

As illustrated, computing device 1300 includes a number of logic elements forming a plurality of nodes. It should be understood that each node may be provided by a physical server, a group of servers, or other hardware. Each server may be running one or more virtual machines as appropriate to its application.

Node 0 1308 is a processing node including a processor socket 0 and processor socket 1. The processors may be, for example, Intel® Xeon™ processors with a plurality of cores, such as 4 or 8 cores. Node 0 1308 may be configured to provide network or workload functions, such as by hosting a plurality of virtual machines or virtual appliances.

Onboard communication between processor socket 0 and processor socket 1 may be provided by an onboard uplink 1378. This may provide a very high speed, short-length interconnect between the two processor sockets, so that virtual machines running on node 0 1308 can communicate with one another at very high speeds. To facilitate this communication, a virtual switch (vSwitch) may be provisioned on node 0 1308, which may be considered to be part of fabric 1370.

Node 0 1308 connects to fabric 1370 via an HFI 1372. HFI 1372 may connect to an Intel® Omni-Path™ fabric. In some examples, communication with fabric 1370 may be tunneled, such as by providing UPI tunneling over Omni-Path™.

Because computing device 1300 may provide many functions in a distributed fashion that in previous generations were provided onboard, a highly capable HFI 1372 may be provided. HFI 1372 may operate at speeds of multiple gigabits per second, and in some cases may be tightly coupled with node 0 1308. For example, in some embodiments, the logic for HFI 1372 is integrated directly with the processors on a system-on-a-chip. This provides very high speed communication between HFI 1372 and the processor sockets, without the need for intermediary bus devices, which may introduce additional latency into the fabric. However, this is not to imply that embodiments where HFI 1372 is provided over a traditional bus are to be excluded. Rather, it is expressly anticipated that in some examples, HFI 1372 may be provided on a bus, such as a PCIe bus, which is a serialized version of PCI that provides higher speeds than traditional PCI. Throughout computing device 1300, various nodes may provide different types of HFIs 1372, such as onboard HFIs and plug-in HFIs. It should also be noted that certain blocks in a system on a chip may be provided as intellectual property (IP) blocks that can be "dropped" into an integrated circuit as a modular unit. Thus, HFI 1372 may in some cases be derived from such an IP block.

Note that in "the network is the device" fashion, node 0 1308 may provide limited or no onboard memory or storage. Rather, node 0 1308 may rely primarily on distributed services, such as a memory server and a networked storage server. Onboard, node 0 1308 may provide only sufficient memory and storage to bootstrap the device and get it communicating with fabric 1370. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 1304 and a node 2 storage server 1310 provide the operational memory and storage capabilities of node 0 1308. For example, memory server node 1 1304 may provide remote direct memory access (RDMA), whereby node 0 1308 may access memory resources on node 1 1304 via fabric 1370 in a direct memory access fashion, similar to how it would access its own onboard memory. The memory provided by memory server 1304 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 1308, a storage server node 2 1310 may be provided. Storage server 1310 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 1308 may access memory from memory server 1304 and store results on storage provided by storage server 1310. Each of these devices couples to fabric 1370 via a HFI 1372, which provides fast communication that makes these technologies possible.

By way of further illustration, node 3 1306 is also depicted. Node 3 1306 also includes a HFI 1372, along with two processor sockets internally connected by an uplink. However, unlike node 0 1308, node 3 1306 includes its own onboard memory 1322 and storage 1350. Thus, node 3 1306 may be configured to perform its functions primarily onboard, and may not be required to rely upon memory server 1304 and storage server 1310. However, in appropriate circumstances, node 3 1306 may supplement its own onboard memory 1322 and storage 1350 with distributed resources similar to node 0 1308.

Computing device 1300 may also include accelerators 1330. These may provide various accelerated functions, including hardware or coprocessor acceleration for functions such as packet processing, encryption, decryption, compression, decompression, network security, or other accelerated functions in the data center. In some examples, accelerators 1330 may include deep learning accelerators that may be directly attached to one or more cores in nodes such as node 0 1308 or node 3 1306. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

In other embodiments, an accelerator could also be provided as an ASIC, FPGA, coprocessor, graphics processing unit (GPU), digital signal processor (DSP), or other processing entity, which may optionally be tuned or configured to provide the accelerator function.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 14:
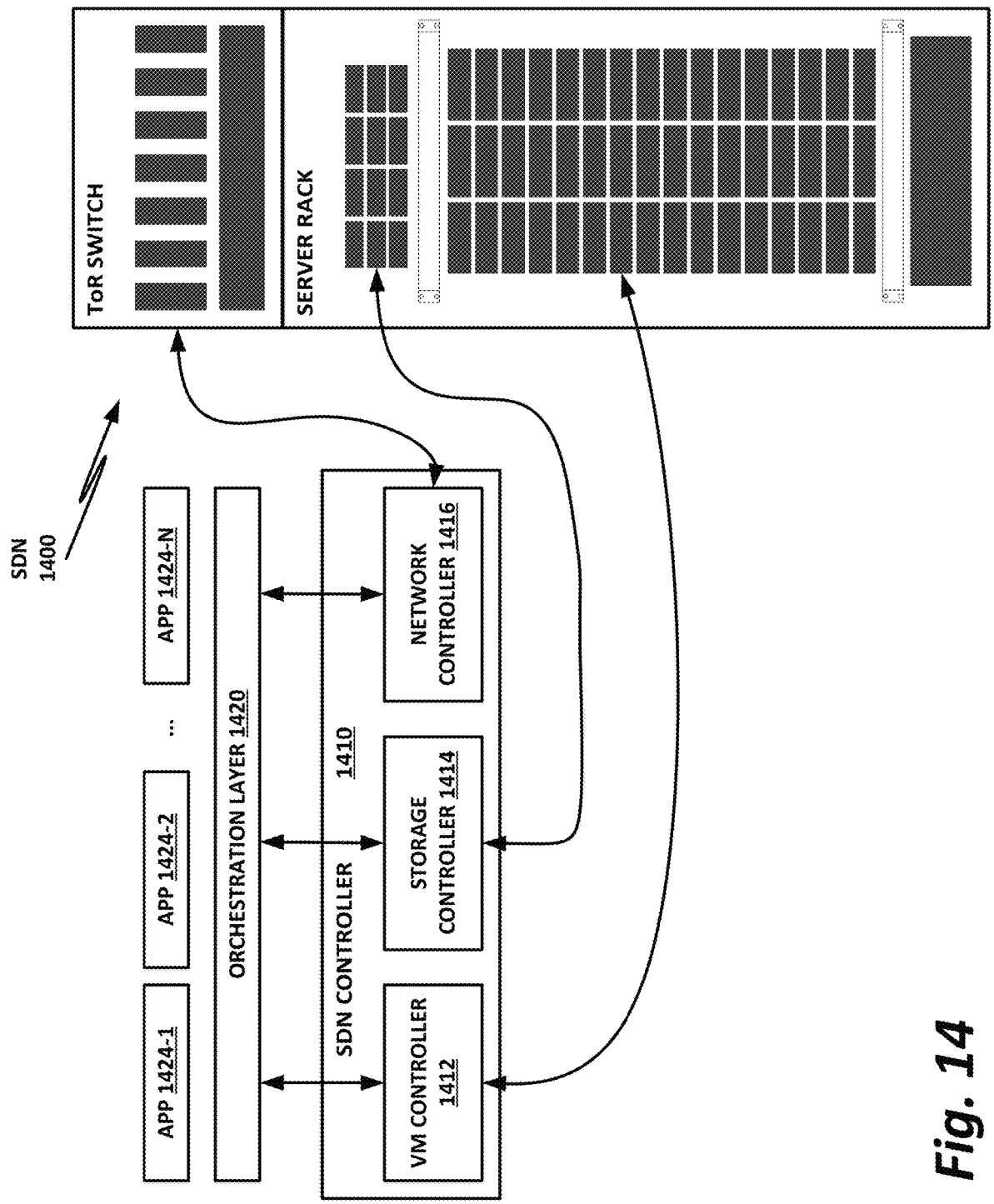
FIG. 14 is a block diagram of a software-defined network (SDN), according to one or more examples of the present specification.

FIG. 14 is a block diagram of a software-defined network 1400, according to one or more examples of the present specification. In software defined networking (SDN), a single configuration utility (often a graphical interface or browser interface) may be used to manage network resources at a high level, with very little manual human intervention into the details of the network. SDN may provide a data plane that is separate from a control plane, to separate management functions from data functions. Another benefit of SDNs is that they may be based on open standards, thus providing portability between systems, and alleviating issues of vendor lock-in.

SDN 1400 is controlled by an SDN controller 1410, which may include, for example, a VM controller 1412, a storage controller 1414, and a network controller 1416. Other SDN controller functions may also be provided in other embodiments, and not every embodiments is required to have the foregoing elements. SDN controller 1410 provides an orchestration layer 1420. The orchestration layer may employ an open orchestration protocol, such as the OpenStack cloud operating system.

Orchestration layer 1420 may include various plugin components that can be used as interfaces to control data center resources. These plugins may interact with orchestration layer 1420 via a set of standardized and open APIs, thus enabling different vendors to provide different plugins. In many cases, data center resources can all be managed via a single graphical interface provided by orchestration layer 1420. For example, OpenStack currently provides a dashboard called "Horizon," which provides a monolithic interface that enables an administrator to fully configure and administer a data center.

In some embodiments, orchestration layer 1420 provides a northbound API, on which may be instantiated various applications or functions, such as applications 1424-1-1424-N illustrated here. Each application 1424 may be provided on a discrete virtual network device or container (referred to herein generically as "network devices"). Applications 1424 may be configured to perform a variety of network functions, such as, by way of nonlimiting example, load-balancing, firewall, deep packet inspection (DPI), DNS, antivirus, or any other suitable network function. The particular arrangement of interconnections between network devices 1430 and from network devices 1430 to host devices 1440 may be determined by the particular network configuration and needs. Thus, the specific configuration of FIG. 14 should be understood to be an illustrative example only.

Orchestration layer may provide communication protocols, including in some embodiments OpenFlow. OpenFlow centralizes networking intelligence into an SDN controller such as SDN controller 1410. Using OpenFlow, switches and routers do not need to use prior data exchange protocols to learn about the network topology and other environmental factors. These topology data are replicated across all switches and routers in the network, and each one maintains forwarding tables. In contrast, an OpenFlow controller (which may be, for example, a function of network controller 1416) provides centralized network management that maintains the network state in a central repository. Network controller 1416 can then update forwarding tables as the network topology evolves or changes, generate a forwarding table for each switch or router, and push them out to network devices as necessary. This realizes separation of the control plane and the data plane. Individual network devices may implement the OpenFlow API by adding an OpenFlow shim layer that translates OpenFlow API function calls into native function calls for the switch or router.

Note that while this illustration shows a single SDN controller 1410, in large data centers, an orchestration controller may control a number of distributed SDN controllers. In some embodiments, SDN controllers and orchestrators can communicate with one another to remain synchronization and state information via a sideband, such as a separate, lower-speed Ethernet connection.

Figure 15:
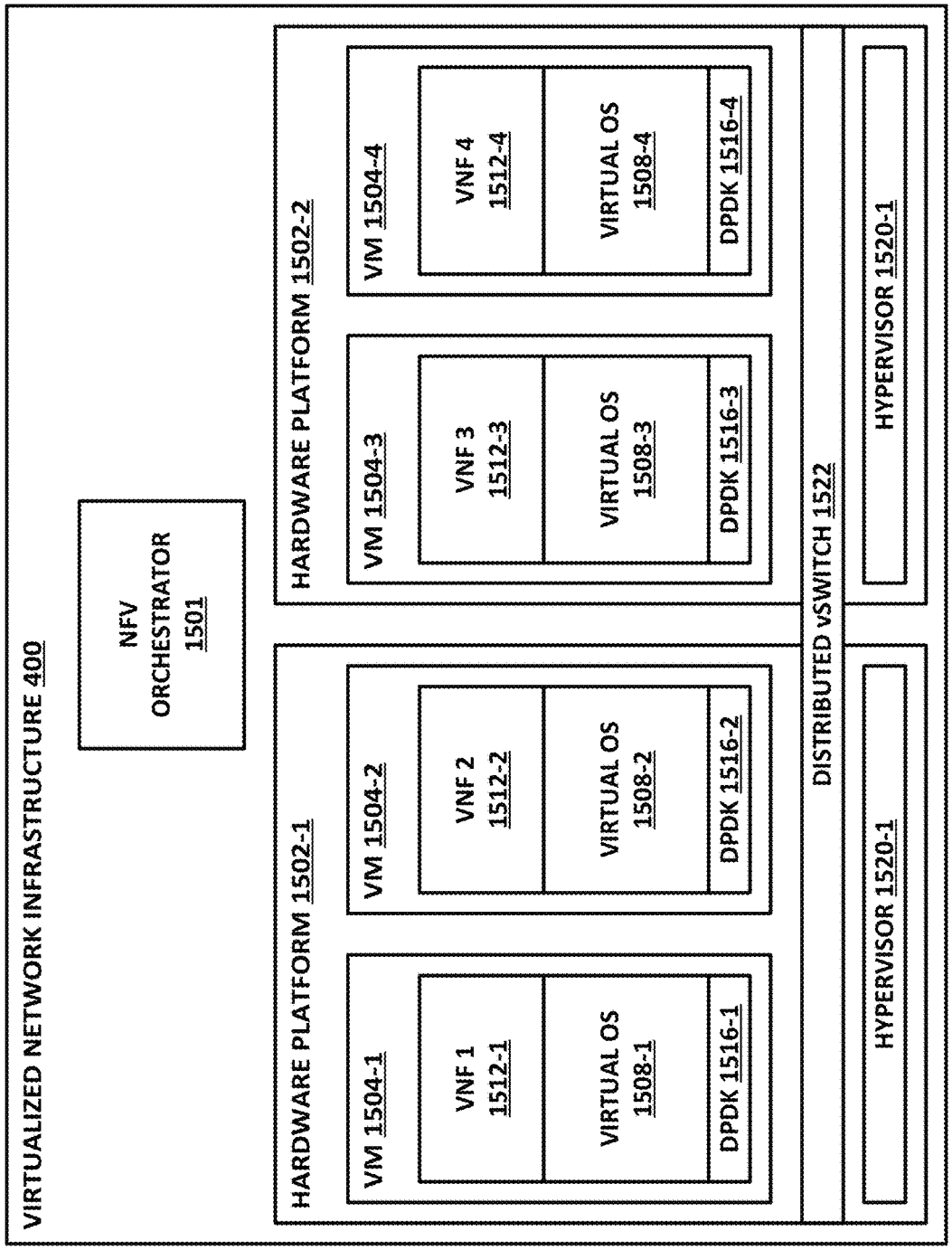
FIG. 15 is a block diagram of a network function virtualization (NFV) infrastructure, according to one or more examples of the present specification.

FIG. 15 is a block diagram of a network function virtualization (NFV) infrastructure 1500, according to one or more examples of the present specification. NFV is an aspect of network virtualization that is generally considered distinct from, but that can still interoperate with SDN. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, virtual network functions (VNFs) can be provisioned ("spun up") or removed ("spun down") to meet network demands. For example, in times of high load, more load balancer VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

Like SDN, NFV is a subset of network virtualization. Thus, the network as illustrated in FIG. 15 may be defined instead of or in addition to the network of FIG. 14. In other words, certain portions of the network may rely on SDN, while other portions (or the same portions) may rely on NFV.

In the example of FIG. 15, an NFV orchestrator 1501 manages a number of the VNFs 1512 running on an NFVI 1500. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1501 a valuable system resource. Note that NFV orchestrator 1501 may provide a browser-based or graphical configuration interface, and in some embodiments may be integrated with SDN orchestration functions.

Note that NFV orchestrator 1501 itself may be virtualized (rather than a special-purpose hardware appliance). NFV orchestrator 1501 may be integrated within an existing SDN system, wherein an operations support system (OSS) manages the SDN. This may interact with cloud resource management systems (e.g., OpenStack) to provide NFV orchestration. An NFVI 1500 may include the hardware, software, and other infrastructure to enable VNFs to run. This may include a hardware platform 1502 on which one or more VMs 1504 may run. For example, hardware platform 1502-1 in this example runs VMs 1504-1 and 1504-2. Hardware platform 1502-2 runs VMs 1504-3 and 1504-4. Each hardware platform may include a hypervisor 1520, virtual machine manager (VMM), or similar function, which may include and run on a native (bare metal) operating system, which may be minimal so as to consume very few resources.

Hardware platforms 1502 may be or comprise a rack or several racks of blade or slot servers (including, e.g., processors, memory, and storage), one or more data centers, other hardware resources distributed across one or more geographic locations, hardware switches, or network interfaces. An NFVI 1500 may also include the software architecture that enables hypervisors to run and be managed by NFV orchestrator 1501.

Running on NFVI 1500 are a number of VMs 1504, each of which in this example is a VNF providing a virtual service appliance. Each VM 1504 in this example includes an instance of the Data Plane Development Kit (DVDK), a virtual operating system 1508, and an application providing the VNF 1512.

Virtualized network functions could include, as nonlimiting and illustrative examples, firewalls, intrusion detection systems, load balancers, routers, session border controllers, deep packet inspection (DPI) services, network address translation (NAT) modules, or call security association.

The illustration of FIG. 15 shows that a number of VNFs 1504 have been provisioned and exist within NFVI 1500. This figure does not necessarily illustrate any relationship between the VNFs and the larger network, or the packet flows that NFVI 1500 may employ.

The illustrated DPDK instances 1516 provide a set of highly-optimized libraries for communicating across a virtual switch (vSwitch) 1522. Like VMs 1504, vSwitch 1522 is provisioned and allocated by a hypervisor 1520. The hypervisor uses a network interface to connect the hardware platform to the data center fabric (e.g., an HFI). This HFI may be shared by all VMs 1504 running on a hardware platform 1502. Thus, a vSwitch may be allocated to switch traffic between VMs 1504. The vSwitch may be a pure software vSwitch (e.g., a shared memory vSwitch), which may be optimized so that data are not moved between memory locations, but rather, the data may stay in one place, and pointers may be passed between VMs 1504 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1522 is illustrated, wherein vSwitch 1522 is shared between two or more physical hardware platforms 1502.

Figure 16:
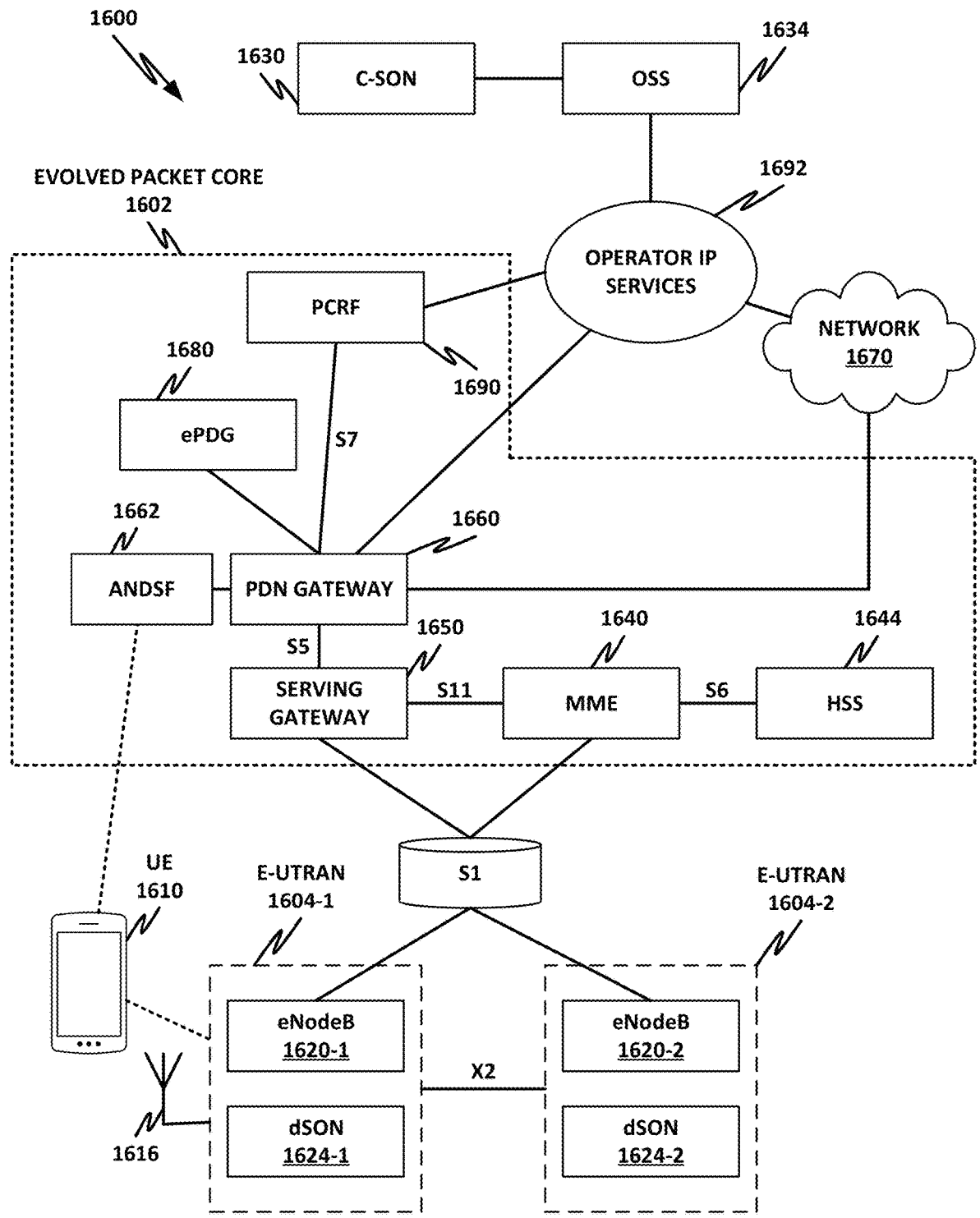
FIG. 16 is a block diagram of a mobile network, according to one or more examples of the present specification.

FIG. 16 is a block diagram of a mobile network 1600, according to one or more examples of the present specification. In this specific example, a fourth-generation long-term evolution (4G LTE, or simply LTE) network is disclosed by way of non-limiting example. In certain embodiments, LTE is used primarily for data transfer, so that mobile network 1600 may also provide, in addition to the elements shown here, structure for handling voice communication, which may communicatively couple to a public-switched telephone network (PSTN). In some cases, voice over LTE (VoLTE) may also be provided. It should also be noted that LTE is disclosed only as one possible embodiment of the teachings of this Specification, and that the teachings may be relevant to other telecommunication structures now in existence or later developed, and the scope of this Specification is intended to encompass such structures where applicable.

In this example, mobile network 1600 includes user equipment (UE) 1610 communicatively coupled, for example via a wireless antenna 1616, to an evolved UMTS radio access network (E-UTRAN) 1604. UE 1610 may initiate a data transaction or session with E-UTRAN 1604-1, referred to herein as a "data call." E-UTRAN 1604 communicatively couples to an evolved packet core (EPC) 1602, for example via wired connections. E-UTRAN 1604 may include, by way of non-limiting example, an evolved NodeB (eNB) 1620, which acts as a wireless base station, and a distributed self-organizing network (dSON) controller 1624.

In various embodiments, these functions may be provided by dedicated servers or appliances. In other embodiments, select functions may be provided in virtual environments, such as a rack-mounted server providing various functions in a hypervisor. In a general sense, the various UE-class devices, server-class devices, network functions, may be generally classified as "computing devices." As used throughout this Specification, a computing device includes any electrical or electronic device based on the Von Neumann architecture, including a processor with a control unit and logic unit, and a memory. In that context, it should be understood that the Von Neumann architecture may be provided either as a physical device, or as a virtual machine or hypervisor running at one or more layers of abstraction from the physical hardware.

In this example, two E-UTRANS 1604-1 and 1604-2 are disclosed to illustrate the mobile nature of the network. UE 1610 may move, for example, as a user carrying UE 1610 moves. As UE 1610 moves farther away from E-UTRAN 1604-1, its signal to E-UTRAN 1604 will attenuate. If UE 1610 simultaneously moves closer to E-UTRAN 1604-2, its signal with E-UTRAN 1604-2 will become stronger. When UE 1610 has moved such that it gets a stronger signal to E-UTRAN 1604-2 than to E-UTRAN 1604-1, E-UTRAN 1604-1 may hand off the data call to E-UTRAN 1604-2, so that E-UTRAN 1604-2 seamlessly continues handling the data call.

Handoff may be handled over the X2 interface. In this example, two classes of signals are passed within mobile network 1600: voice, data, and call signals (referred to herein as the "user plane" signals) and control signals (referred to herein as the "control plane" signals). X2 provides both a control plane interface and a user plane interface, and in an embodiment is a wired connection between the two E-UTRANs 1604. The protocol structure of the S1 control plane is based on stream control transmission protocol/internet protocol (SCTP/IP). The user plane provides a protocol structure based on general packet radio service (GPRS) tunneling protocol/user datagram protocol/ IP (GTP/UDP5/IP). On the user plane, a transport bearer may be identified by an IP address and one or more GTP tunneling endpoint IDs (TEID). X2 operates as a meshed interface, meaning that a plurality of eNBs 1620 may all be linked together. Properly configured, X2 helps to minimize packet loss as UE 1610 hands off from one E-UTRAN 1604 to another. Specifically, when the data call is handed off, unsent or unacknowledged packets stored in the old eNB 1620's queues can be forwarded or tunneled to the new eNB 1620 via the X2 interface.

E-UTRANs 1604 communicatively couple to an EPC 1602 via an S1 interface. As with the X2 interface, S1 provides both a control plane and a user plane, configured similarly to the respective X2 control plane and user plane. In an embodiment, the S1 application protocol (S1-AP) is mapped directly on top of SCTP.

In this example, EPC 1602 includes a serving gateway (SGW) 1650, a mobility management entity (MME) 1640, a home subscriber server (HSS) 1644, a packet data network (PDN) gateway (PDN) 1660, an evolved packet data gateway (ePDG) 1680, and policy and charging rules function (PCRF) 1690. EPC 1602 for its part may communicatively couple, via appropriate interfaces, to a public network such as internet 1670, or to operator IP services 1692.

When UE 1610 is performing data operations, such as web applications, web surfing, e-mail, or other network operations, UE 1620 connects to Internet 1670 via mobile network 1600. In one example scenario, user plane signals originate from UE 1610 and are passed to E-UTRAN 1604. Within E-UTRANs 1604, user plane signals are first received by eNB 1620 (or other similar base station), which interfaces with EPC 1602 to handle the data call.

As a wireless local area network (WLAN) access point (WAP), eNB 1620 supports Layer 1 and Layer 2 of the E-UTRAN orthogonal frequency division multiplexing (OFDM) physical interface. Advantageously, eNBs 1620 may directly connect to a network router, thus simplifying network architecture. Further, eNB 1620 may support certain legacy features related to physical layer procedures for transmitting and receiving, including modulation and demodulation, and channel encoding and decoding. Additionally, eNB 1620 may also provide radio resource control and radio mobility management for processing handovers.

EPC 1602 provides several functional blocks to provide various support functions. These are described herein by way of non-limiting example only.

MME 1640 provides control functions to EPC 1602. MME 1640 provides idle mode UE paging and tagging procedures, including retransmissions. MME 1640 also provides bearer activation and deactivation support, and may choose an appropriate SGW 1650 for UE 1610 when UE 1610 initially attaches to EPC 1602 via E-UTRAN 1604. After attachment, MME 1640 authenticates UE 1610 via HSS 1644.

Non Access Stratum (NAS) signaling terminates at MME 1640, and MME 1640 is also responsible for generating and allocating a temporary identity for UE 1610. MME 1640 then verifies the authorization of UE 1610 to resources on the service provider's public land mobile network (PLMN), and enforces roaming restrictions on UE 1610. MME 1640 is also a terminal endpoint for ciphering/integrity protection for NAS signaling, and handles security key management. MME 1640 also supports lawful signal interception. MME 1640 also provides control plane functions for mobility between LTE and 2G/3G networks with the S3 interface terminating at MME 1640 from, for example, a 3G serving GPRS support node (SGSN). Finally, MME 1640 terminates the Sha interface of HSS 1644 for roaming UEs.

HSS 1644 is, in an embodiment, a database server to provide home location register (HLR) and authentication center (AuC) services. The functions of the HSS include call and session establishment support, user authentication, and access authorization, by way of non-limiting example.

In an embodiment, HLR stores and updates a user subscription information database. This may include the following, by way of nonlimiting example:
 a. User identification and addressing, including the International Mobile Subscriber Identity (IMSI), Mobile Subscriber ISDN Number (MSISDN), and/or mobile telephone number.
 b. User profile information, including subscriptions and quality of service (QoS) data.

AuC generates security data from user identity keys, and provides the data to at least the HLR, and as necessary, to other functional blocks.

SGW 1650 forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN Gateway 1650). When UE 1610 is idle, SGW 1650 terminates the downlink data path and triggers paging when downlink data arrives for UE 1610. SGW 1650 may also store UE contexts including parameters of the IP bearer service and network internal routing information. It also performs replication of the user traffic in case of lawful interception.

PDN Gateway 1660 provides connectivity from UE 1610 to external packet data networks (PDNs) and provides both an entry point and exit point for UE traffic. UE 1610 may simultaneously connect to more than one PDN Gateway 1650, and thus may access multiple PDNs. In an example, PDN Gateway 1650 provides policy enforcement, packet filtering on a per-user basis, charging support, lawful interception, and packet screening, by way of nonlimiting example.

Access Network Discovery and Selection Function (ANDSF) 1662 helps UE 1610 discover non-3GPP access networks, such as Wi-Fi or WIMAX, that can be used in addition to the LTE network for data communication. ANDSF 1660 may provide UE 1610 with rules policing the connection to such networks. ANDSF 1660 may provide the following to UE, by way of non-limiting example:
 a. Inter-system mobility policy (ISMP)—network selections rules for when UE 1610 has no more than one active access network connection (e.g., either LTE or Wi-Fi).
 b. Inter-system routing policy (ISRP)—network selection rules for when UE 1610 has potentially more than one active access network connection (e.g., both LTE and Wi-Fi). In this case, UE 1610 may employ IP flow mobility, multiple-access PDN connectivity (MAP-CON), or non-seamless Wi-Fi offload according to policy and user preferences.
 c. Discovery information—a list of networks that may be available in the vicinity of UE 1610, and information to help UE 1610 connect to these networks.

ANDSF 1662 may communicates with the UE 1610 over the S14 reference point, which in some embodiments is specific to ANDSF.

PCRF 1690 provides, in an embodiment, both policy decision functions (PDF) and charging rules functions (CRF).

PDF makes policy decisions. Specifically, when an IP multimedia subsystem (IMS) is set up, session initiation protocol (SIP) data include media requirements, which the terminal and proxy call session control function (P-CSCF) may exchange between themselves. During the session establishment process, the PDF may also receive those requirements from the P-CSCF and make decisions based on network operator rules. These may include, by way of non-limiting example:
 a. Allowing or rejecting a media request.
 b. Using new or existing PDP context for an incoming media request.
 c. Checking allocation of resources against authorized resource usage.

The CRF provides operator-defined charging rules applicable to each service data flow. The CRF selects the relevant charging rules based on information provided by the P-CSCF, such as Application Identifier, Type of Stream (audio, video, etc.), or Application Data Rate, by way of nonlimiting example.

Data transmission is secured by ePDG 1680 with a UE 1610 connected to EPC 1602 over an untrusted, non-3GPP access. For this purpose, the ePDG acts as a termination node of IPsec tunnels established with UE 1610.

Network 1670 may be any suitable network or combination of one or more networks operating on one or more suitable networking protocols, including for example, a local area network, an intranet, a virtual network, a wide area network, a wireless network, a cellular network, or the Internet (optionally accessed via a proxy, virtual machine, or other similar security mechanism) by way of nonlimiting example. Network 1670 may also include one or more servers, firewalls, routers, switches, security appliances, antivirus servers, or other useful network devices. In this illustration, network 1670 is shown as a single network for simplicity, but in some embodiments, network 1670 may include a large number of networks, such as one or more enterprise intranets connected to the Internet.

Operator IP services 1692 include services provided by an operator of EPC 1602. Operator IP services 1692 may include, or may communicatively couple to an operations support system (OSS) 1632. OSS 1632 provides hardware and software for monitoring, controlling, analyzing, and managing EPC 1602.

Advantageously, LTE provides for self-organizing networks (SONs) (also sometimes called a self-optimizing network, which is used interchangeably). SON provides automation methods to facilitate planning, configuring, managing, optimizing, and healing a network such as EPC 1602 and E-UTRAN 1604.

SON may be provided in different flavors, including for example centralized SON (C-SON) 1630, distributed SON (dSON) 1624, and in some cases hybrid SON (hSON).

C-SON 1630 provides centralized higher-level network control, with increased coordination between nodes for functions such as load balancing across a wide geographic area. In contrast, dSON 1624 provides a distributed, peer-to-peer control function, in which each E-UTRAN network wirelessly receives reported parameters from other E-UTRANs, and makes autonomous decisions based on those reports. hSON (not shown in this illustration) provides a hybrid solution in which some functions are centralized and others are distributed.

Advantageously, SON provides useful functions such as:
a. Self-Configuration. In a self-configuration network, new base stations are automatically configured and integrated into the network, and new features on a base station are also seamlessly integrated. When a new base station is introduced into the network and powered on, it is immediately recognized and registered by the network. The neighboring base stations then automatically adjust to provide the required coverage and capacity, as well as to avoid the interference.
b. Self-Optimization. Base station such as eNBs 1620 may provide configuration parameters intended to control and/or optimize their behavior. Based on observations of both eNB 1620 itself, and measurements at UE 1610 or elsewhere, a SON may automatically reconfigure these parameters to enhance network efficiency. In another embodiment, SON provides automatic neighbor relations (ANR), and optimizes random access parameters or mobility robustness. In yet another embodiment, SON switches off some number of base stations at night to conserve power. These base stations may be selected to ensure that full coverage is still provided in a coverage area. Neighboring base station may reconfigure appropriate parameters to ensure full coverage and adjust to the changed network topology. If a sudden spike in demand occurs, one or more sleeping base stations may wake up almost instantaneously. This may realize significant power savings without sacrificing network
c. Self-Healing. If a network node (such as an eNB 1620) goes down, self-healing helps to mitigate the effect of the failure on the overall network. For example a SON may adjust parameters and algorithms in adjacent eNBs 1620 so that they can continue to provide service to the failed eNB 1620. This is in contrast to legacy networks, where substantial time and resources may need to be committed to repairs when a base station fails. With self-healing networks, the network may automatically and nearly-instantaneously self-adjust with little or no service interruption.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other nonvolatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform; and a service chain pre-placement analyzer to operate on the hardware platform and configured to: receive a total utility input for a service chain placement; predict a mobility pattern for the service chain placement; and compute an average utility for the service chain placement, wherein the average utility is a product of the total utility and the mobility pattern.

Example 2 includes the computing apparatus of example 1, wherein the service chain includes an edge component.

Example 3 includes the computing apparatus of example 1, wherein the mobility pattern comprises a probability of a mobile resource to take a path that will result in the service chain placement.

Example 4 includes the computing apparatus of example 3, wherein the mobility pattern comprises a probability that a mobile resource will either continue straight ahead or take a turn.

Example 5 includes the computing apparatus of example 1, wherein the pre-placement analyzer is further to create a matrix of possible service chain placements, and assign an average utility to each service chain placement.

Example 6 includes the computing apparatus of example 1, wherein the pre-placement analyzer is further to select from the matrix a service chain placement with the highest average utility.

Example 7 includes the computing apparatus of example 1, wherein the service chain analyzer is further to output the matrix of possible service chain placements to a placement selector.

Example 8 includes the computing apparatus of example 1, wherein the apparatus is further to provide an initialization phase to compute cost, capacity, utilization, and mobility of infrastructure resources Example 9 includes the computing apparatus of example 1, wherein the apparatus is further to provide a placement computation phase, comprising computing a reduced set of possible service chain placements from among a set of all possible service chain placements.

Example 10 includes the computing apparatus of example 1, wherein the total utility comprises provider-centric attributes, customer centric attributes, and gross profit.

Example 11 includes the computing apparatus of example 1, wherein the total utility is normalized to the range [0,1].

Example 12 includes the computing apparatus of example 1, wherein computing the average utility comprises a computation of the form $U_{avg} = P_{turn} \cdot d_{diff} \cdot (utility_{diff} - cost_{migrate})$, wherein $U_{avg}$ is the average utility, $p_{turn}$ is the probability that a mobile resource will take a given route, $d_{diff}$ is a difference between a nearest static resource and a velocity-weighted time to migrate to a resource in a changed direction, $utility_{diff}$ is the utility difference between a current service chain placement and a migrated service chain placement, and $cost_{migrate}$ is the cost of migrating the service chain to the migrated service chain placement.

Example 13 includes the computing apparatus of any of examples 1-12, wherein the apparatus is to compute the average utility for a long-term evolution (LTE) or fifth-generation mobile network.

Example 14 includes the computing apparatus of any of examples 1-12, wherein the apparatus is further to send commands to realize the service chain placement on a mobile network.

Example 15 includes one or more tangible, non-transitory computer-readable storage mediums having stored thereon executable instructions to instruct an apparatus to: receive a total utility input for a service chain placement; predict a mobility pattern for the service chain placement; and compute an average utility for the service chain placement, wherein the average utility is a product of the total utility and the mobility pattern.

Example 16 includes the one or more tangible, non-transitory computer-readable storage mediums of example 15, wherein the service chain includes an edge component.

Example 17 includes the one or more tangible, non-transitory computer-readable storage mediums of example 15, wherein the mobility pattern comprises a probability of a mobile resource to take a path that will result in the service chain placement.

Example 18 includes the one or more tangible, non-transitory computer-readable storage mediums of example 17, wherein the mobility pattern comprises a probability that a mobile resource will either continue straight ahead or take a turn.

Example 19 includes the one or more tangible, non-transitory computer-readable storage mediums of example 15, wherein the instructions are further to create a matrix of possible service chain placements, and assign an average utility to each service chain placement.

Example 20 includes the one or more tangible, non-transitory computer-readable storage mediums of example 15, wherein the instructions are further to select from the matrix a service chain placement with the highest average utility.

Example 21 includes the one or more tangible, non-transitory computer-readable storage mediums of example 15, wherein the instructions are further to output the matrix of possible service chain placements to a placement selector.

Example 22 includes the one or more tangible, non-transitory computer-readable storage mediums of example 15, wherein the instructions are further to provide an initialization phase to compute cost, capacity, utilization, and mobility of infrastructure resources.

Example 23 includes the one or more tangible, non-transitory computer-readable storage mediums of example 15, wherein the instructions are further to provide a placement computation phase, comprising computing a reduced set of possible service chain placements from among a set of all possible service chain placements.

Example 24 includes the one or more tangible, non-transitory computer-readable storage mediums of example 15, wherein the total utility comprises provider-centric attributes, customer centric attributes, and gross profit.

Example 25 includes the one or more tangible, non-transitory computer-readable storage mediums of example 15, wherein the total utility is normalized to the range [0,1].

Example 26 includes the one or more tangible, non-transitory computer-readable storage mediums of example 15, wherein computing the average utility comprises a computation of the form $U_{avg}=p_{turn} \cdot d_{diff} \cdot (utility_{diff} - cost_{migrate})$, wherein $U_{avg}$ is the average utility, $p_{turn}$ is the probability that a mobile resource will take a given route, $d_{diff}$ is a difference between a nearest static resource and a velocity-weighted time to migrate to a resource in a changed direction, $utility_{diff}$ is the utility difference between a current service chain placement and a migrated service chain placement, and $cost_{migrate}$ is the cost of migrating the service chain to the migrated service chain placement.

Example 27 includes the one or more tangible, non-transitory computer-readable storage mediums of any of examples 15-26, wherein the instructions are to compute the average utility for a long-term evolution (LTE) or fifth-generation mobile network.

Example 28 includes the one or more tangible, non-transitory computer-readable storage mediums of any of examples 15-26, wherein the instructions are further to send commands to realize the service chain placement on a mobile network.

Example 29 includes a computer-implemented method of providing service chain pre-placement, comprising: receiving a total utility input for a service chain placement; predicting a mobility pattern for the service chain placement; and computing an average utility for the service chain placement, wherein the average utility is a product of the total utility and the mobility pattern.

Example 30 includes the method of example 29, wherein the service chain includes an edge component.

Example 31 includes the method of example 29, wherein the mobility pattern comprises a probability of a mobile resource to take a path that will result in the service chain placement.

Example 32 includes the method of example 31, wherein the mobility pattern comprises a probability that a mobile resource will either continue straight ahead or take a turn.

Example 33 includes the method of example 29, further comprising creating a matrix of possible service chain placements, and assigning an average utility to each service chain placement.

Example 34 includes the method of example 29, further comprising selecting from the matrix a service chain placement with the highest average utility.

Example 35 includes the method of example 29, further comprising outputting the matrix of possible service chain placements to a placement selector.

Example 36 includes the method of example 29, further comprising providing an initialization phase to compute cost, capacity, utilization, and mobility of infrastructure resources.

Example 37 includes the method of example 29, further comprising providing a placement computation phase, comprising computing a reduced set of possible service chain placements from among a set of all possible service chain placements.

Example 38 includes the method of example 29, wherein the total utility comprises provider-centric attributes, customer centric attributes, and gross profit.

Example 39 includes the method of example 29, wherein the total utility is normalized to the range [0,1].

Example 40 includes the method of example 29, wherein computing the average utility comprises a computation of the form $U_{avg}=p_{turn} \cdot d_{diff} \cdot (utility_{diff} - cost_{migrate})$, wherein $U_{avg}$ is the average utility, $p_{turn}$ is the probability that a mobile resource will take a given route, $d_{diff}$ is a difference between a nearest static resource and a velocity-weighted time to migrate to a resource in a changed direction, $utility_{diff}$ is the utility difference between a current service chain placement and a migrated service chain placement, and $cost_{migrate}$ is the cost of migrating the service chain to the migrated service chain placement.

Example 41 includes the method of any of examples 29-40, wherein computing the average utility comprise computing the average utility for a long-term evolution (LTE) or fifth-generation mobile network.

Example 42 includes the method of any of examples 29-40, further comprising sending commands to realize the service chain placement on a mobile network.

Example 43 includes an apparatus comprising means for performing the method of any of examples 29-42.

Example 44 includes the apparatus of example 43, wherein the means for performing the method comprise a processor and a memory.

Example 45 includes the apparatus of example 44, wherein the memory comprises machine-readable instructions, that when executed cause the apparatus to perform the method of any of examples 29-42.

Example 46 includes the apparatus of any of examples 43-45, wherein the apparatus is a computing system.

Example 47 includes at least one computer readable medium comprising instructions that, when executed, implement a method or realize an apparatus as illustrated in any of examples 29-46.

What is claimed is:

1. A computing apparatus, comprising:
a processor and a memory; and
instructions encoded within the memory to instruct the processor to:
receive a total utility input for a service chain placement, the total utility including a utility of the service chain placement servicing a base station;
predict a user equipment (UE) mobility pattern for the service chain placement, including a probability of the UE connecting to the base station;
compute an average utility for the service chain placement, wherein the average utility is a product of the total utility and the mobility pattern; and
direct placement of a service chain based at least in part on the average utility.

2. The computing apparatus of claim 1, wherein the service chain includes an edge component.

3. The computing apparatus of claim 1, wherein the mobility pattern comprises a probability of the UE to take a path that will result in the service chain placement.

4. The computing apparatus of claim 3, wherein the mobility pattern comprises a probability that the UE will either continue straight ahead or take a turn.

5. The computing apparatus of claim 1, wherein the instructions are further to create a matrix of possible service chain placements, and assign an average utility to each service chain placement.

6. The computing apparatus of claim 1, wherein the instructions are further to select from the matrix a service chain placement with the highest average utility.

7. The computing apparatus of claim 1, wherein the instructions are further to output the matrix of possible service chain placements to placement selection instructions.

8. The computing apparatus of claim 1, wherein the instructions are further to provide an initialization phase to compute cost, capacity, utilization, and mobility of infrastructure resources.

9. The computing apparatus of claim 1, wherein the instructions are further to provide a placement computation phase, comprising computing a reduced set of possible service chain placements from among a set of all possible service chain placements.

10. The computing apparatus of claim 1, wherein the total utility comprises provider-centric attributes, customer centric attributes, and gross profit.

11. The computing apparatus of claim 1, wherein the total utility is normalized to the range.

12. The computing apparatus of claim 1, wherein computing the average utility comprises a computation of the form $U_{avg} = p_{turn}^{-d}{}_{diff} \cdot (utility_{diff} - cost_{migrate})$ wherein $U_{avg}$ is the average utility, $p_{turn}$ is the probability that a mobile resource will take a given route, $d_{diff}$ is a difference between a nearest static resource and a velocity-weighted time to migrate to a resource in a changed direction, $utility_{diff}$ is the utility difference between a current service chain placement and a migrated service chain placement, and $cost_{migrate}$ is the cost of migrating the service chain to the migrated service chain placement.

13. The computing apparatus of claim 1, wherein the instructions are to compute the average utility for a long-term evolution (LTE) or fifth-generation mobile network.

14. The computing apparatus of claim 1, wherein the instructions are further to send commands to realize the service chain placement on a mobile network.

15. One or more tangible, non-transitory computer-readable storage mediums having stored thereon executable instructions to instruct an apparatus to:
receive a total utility input for a service chain placement, the total utility input including a utility of the service chain servicing a selected wireless base station;
predict a mobility pattern for the service chain placement, including a probability of a user equipment (UE) device connecting to the wireless base station;
compute an average utility for the service chain placement, wherein the average utility is a product of the total utility and the mobility pattern.

16. The one or more tangible, non-transitory computer-readable storage mediums of claim 15, wherein the service chain includes an edge component.

17. The one or more tangible, non-transitory computer-readable storage mediums of claim 15, wherein the mobility pattern comprises a probability of the UE to take a path that will result in the service chain placement.

18. The one or more tangible, non-transitory computer-readable storage mediums of claim 17, wherein the mobility pattern comprises a probability that the UE will either continue straight ahead or take a turn.

19. The one or more tangible, non-transitory computer-readable storage mediums of claim 15, wherein the instructions are further to create a matrix of possible service chain placements, and assign an average utility to each service chain placement.

20. The one or more tangible, non-transitory computer-readable storage mediums of claim 19, wherein the instructions are further to select from the matrix a service chain placement with the highest average utility.

21. The one or more tangible, non-transitory computer-readable storage mediums of claim 19, wherein the instructions are further to output the matrix of possible service chain placements to a placement selector subroutine.

22. The one or more tangible, non-transitory computer-readable storage mediums of claim 15, wherein the instructions are further to provide an initialization phase to compute cost, capacity, utilization, and mobility of infrastructure resources.

23. The one or more tangible, non-transitory computer-readable storage mediums of claim 15, wherein the instructions are further to provide a placement computation phase, comprising computing a reduced set of possible service chain placements from among a set of all possible service chain placements.

24. A computer-implemented method of providing service chain pre-placement, comprising:
receiving a total utility input for a service chain placement, the total utility input associating the total utility with placement of a service chain to service a mobile base station;
predicting a mobility pattern for the service chain placement, the mobility pattern including a probability of a user equipment (UE) device connecting to the mobile base station;
computing an average utility for the service chain placement, wherein the average utility is a product of the total utility and the mobility pattern; and
directing pre-placement of a service chain based at least in part on the average utility.

25. The method of claim 24, wherein the service chain includes an edge component.

* * * * *

UNITED STATES PATENT AND TRADEMARK OFFICE
CERTIFICATE OF CORRECTION

PATENT NO. : 11,184,778 B2  
APPLICATION NO. : 15/900604  
DATED : November 23, 2021  
INVENTOR(S) : Radhika Loomba et al.

Page 1 of 1

It is certified that error appears in the above-identified patent and that said Letters Patent is hereby corrected as shown below:

In the Claims

In Column 37, Claim 11, Line 8, delete "range." and insert -- range [0, 1]. --, therefor.

Signed and Sealed this  
Eleventh Day of January, 2022

Drew Hirshfeld  
*Performing the Functions and Duties of the*  
*Under Secretary of Commerce for Intellectual Property and*  
*Director of the United States Patent and Trademark Office*